(12) United States Patent
Harding

(10) Patent No.: US 7,325,579 B2
(45) Date of Patent: Feb. 5, 2008

(54) WATERING CAN AUGMENTED BY PUMP AND SNORKEL DEVICE

(76) Inventor: Nathan H. Harding, 320 Forest St., Oakland, CA (US) 94618

( * ) Notice: Subject to any disclaimer, the term of this patent is extended or adjusted under 35 U.S.C. 154(b) by 525 days.

(21) Appl. No.: 10/937,209

(22) Filed: Sep. 9, 2004

(65) Prior Publication Data

US 2005/0051231 A1 Mar. 10, 2005

Related U.S. Application Data

(60) Provisional application No. 60/501,711, filed on Sep. 10, 2003.

(51) Int. Cl.
 *B65B 1/04* (2006.01)
(52) U.S. Cl. .............................. 141/98; 141/2; 141/27; 141/230; 222/383.2; 222/529
(58) Field of Classification Search ............ 141/2, 141/8, 18, 27, 65, 67, 98, 230, 384, 386; 222/383.2, 529, 482, 530, 608; 418/265, 418/266; 417/118; 137/205
See application file for complete search history.

(56) References Cited

U.S. PATENT DOCUMENTS

| | | |
|---|---|---|
| 314,851 A | 3/1885 | Kelly |
| 1,183,129 A | 5/1916 | Small |
| 1,604,385 A | 10/1926 | Bullock et al. |
| 1,699,459 A | 1/1929 | Ullrich |
| 2,334,148 A | 11/1943 | Jones |
| 2,488,573 A | 11/1949 | Wood |
| 4,030,664 A | 6/1977 | Tisbo et al. |
| 4,228,930 A | 10/1980 | Hogan |
| 4,350,268 A | 9/1982 | Potter |
| D266,450 S | 10/1982 | Swett et al. |
| 4,392,594 A | 7/1983 | Swett et al. |
| 4,621,770 A | 11/1986 | Sayen |
| 4,700,892 A | 10/1987 | Cunning |
| 4,997,003 A | 3/1991 | Brennan |
| 5,056,621 A * | 10/1991 | Trevino ...................... 184/1.5 |
| 5,667,113 A * | 9/1997 | Clarke et al. ................ 222/608 |
| 5,772,402 A * | 6/1998 | Goodman .................... 417/118 |
| 5,961,006 A | 10/1999 | Dunham et al. |
| 6,321,874 B1 * | 11/2001 | Miyamoto ................... 184/1.5 |
| 6,357,492 B1 * | 3/2002 | Hsu ............................. 141/26 |
| 7,163,034 B2 * | 1/2007 | Franks ......................... 141/67 |

\* cited by examiner

*Primary Examiner*—Timothy L. Maust

(57) ABSTRACT

A watering can includes a pump and a snorkel which can be used to draw water out of a vessel and into the watering can. The snorkel device is put into a vessel from which water is to be evacuated and the pump is cranked in order to start the flow of water from the vessel and into the reservoir of the watering can. In some embodiments, the pump is a peristaltic pump which includes a mode where the pump is fully disengaged and fluid may flow freely from the snorkel, through the pump, and into the reservoir of the watering can. This allows the operator to use the pump to start a siphoning process which evacuates the remainder of the water from the vessel without further pumping. When not being used to draw water out of a vessel, the watering can may be used in the ordinary manner.

17 Claims, 25 Drawing Sheets

WATERING CAN AUGMENTED BY PUMP AND SNORKEL DEVICE

CROSS-REFERENCE TO RELATED APPLICATION(S)

This application claims the benefit of U.S. Provisional Application No. 60/501,711 filed Sep. 10, 2003.

This application also claims the benefit of U.S. Provisional Application No. 60/528,070 filed Dec. 9, 2003.

FIELD OF THE INVENTION

The invention relates to watering cans or water carrying pitchers, especially those watering cans which are made to be used indoors for the care of house plants and cut flowers.

BACKGROUND OF THE INVENTION

There is a common problem encountered while caring for an arrangement of cut flowers: It is difficult to change the water in which the flowers reside because doing so requires removing the flowers to turn the container upside down. Changing the water in such arrangements is advised in order to extend the life of the flowers and to avoid the water becoming unsightly and smelly.

There are other household problems encountered which involve water or another liquid which needs to be removed from a vessel without turning it upside down. Another example is the catch tray under a large potted plant which may fill with water if the plant is over watered. One more is the water in a fish tank which needs to be periodically changed. A third example is a clogged sink which may be filled with water.

Separate devices, such as siphons or small hand pumps, could be used to solve these problems, but they are inconvenient because they need to be cleaned and stored separately from other household cleaning equipment. Most households, however, have a watering can for flowers or a water carrying pitcher of some kind for a fish bowl which are kept handy and used often. It is therefore convenient that these devices (a watering can or pitcher) be augmented by something which can solve these other household problems.

In the past, watering cans have been augmented with many devices which allow one to distribute the water in the can in various ways such as a spray or in a hose. The focus of these inventions is distributing water rather than taking it in. Many watering cans, for instance, exist which include sprayers for spraying the leaves of plants. Other watering cans have been created which may distribute water through a tube for easy watering.

Buckets have also been augmented in order to distribute water through a hose rather than pouring by tilting the bucket. Consequently a need exists for a watering can which addresses the problems of previous designs.

SUMMARY OF THE INVENTION

The invention is a watering can or water carrying pitcher, which is augmented by a pump and a wand-like snorkel device. The wand-like snorkel device can be placed into an arrangement of cut flowers or other vessel and used to extract the water within the vessel without moving the vessel or disturbing the contents in the vessel. The water is extracted using the pump which is preferably actuated by hand but might also be actuated by an electric motor.

DETAILED DESCRIPTION OF THE INVENTION

Figure 1:
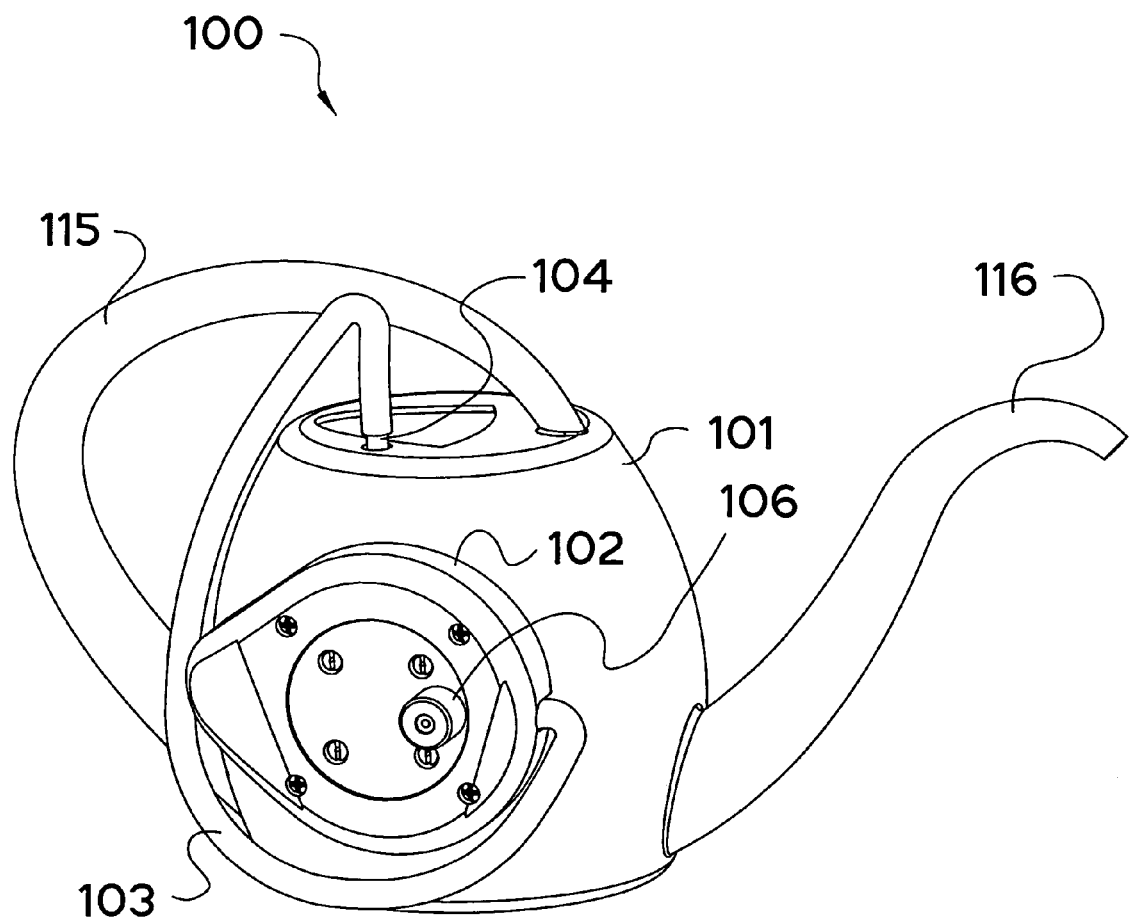
FIG. 1 is a perspective view of a watering can of the present invention.
Figure 2:
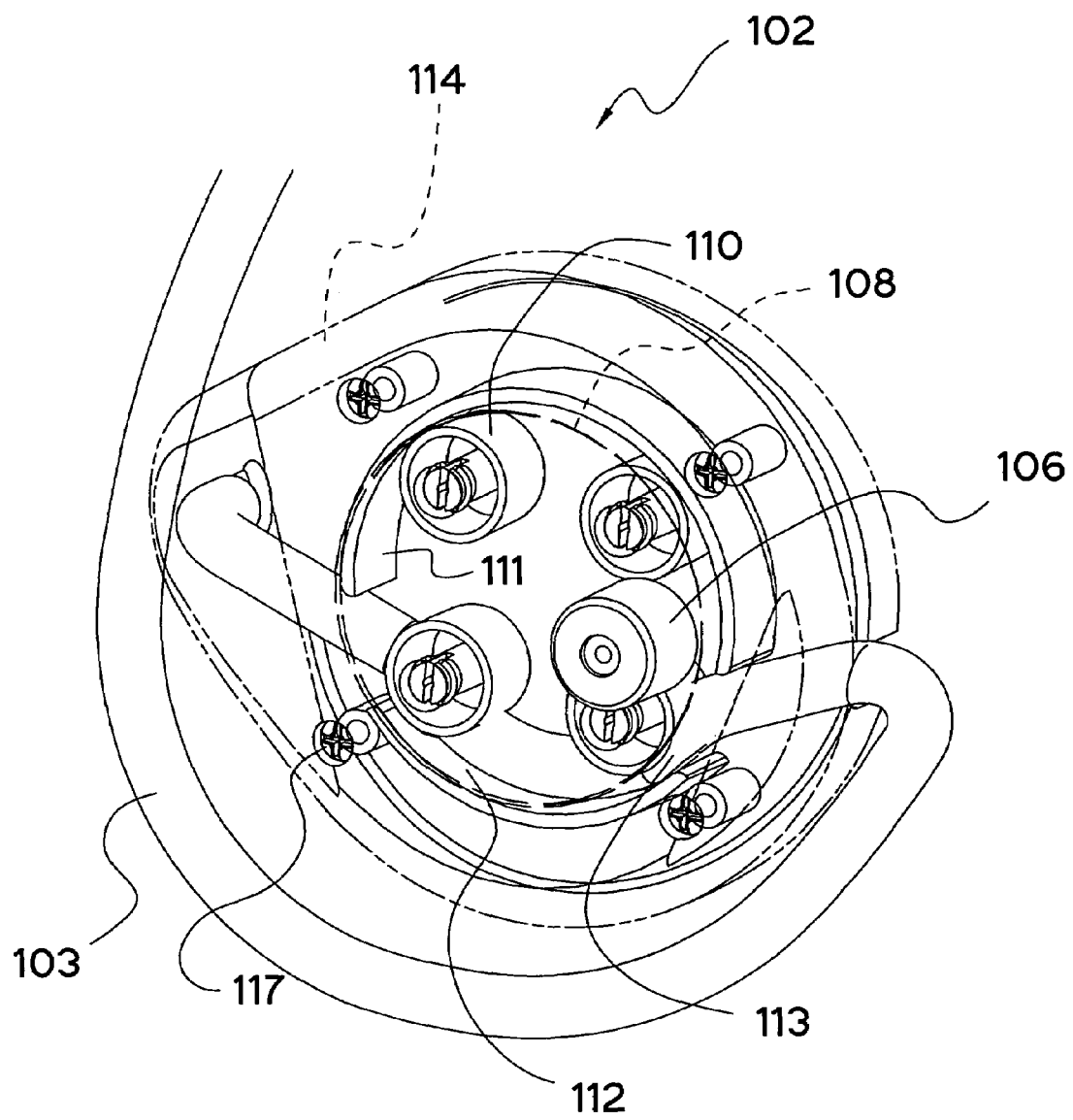
FIG. 2 is a perspective detail view of FIG. 1 which shows the pump section with the cover and pump drive plate appearing transparent (indicated by phantom lines) so that the inside of the pump may be seen.
Figure 3:
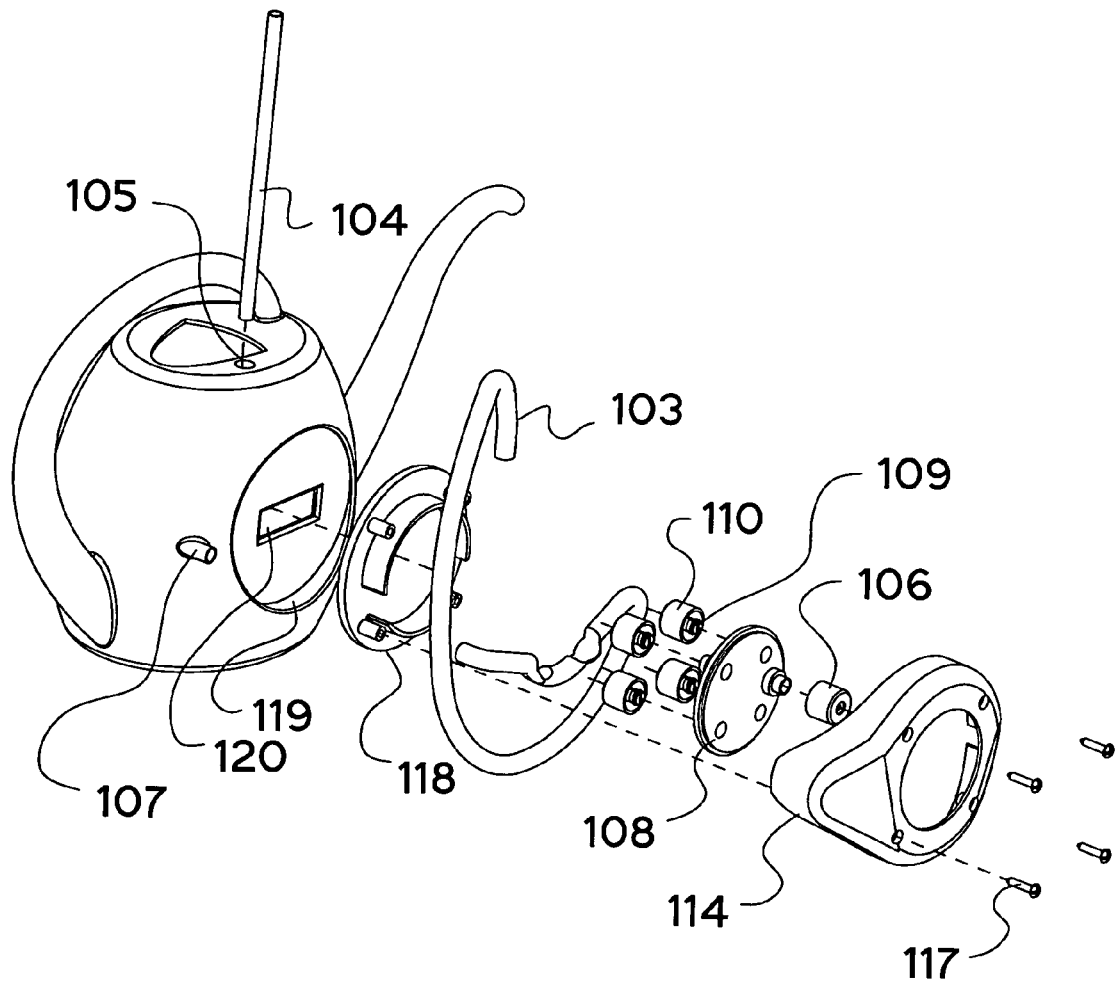
FIG. 3 is an exploded view of FIG. 1.

A watering can 100 of the present invention is shown in FIGS. 1 through 3. The basic external features of the watering can 100 are as follows. The body component 101 of the watering can 100 is augmented by a pump 102, which in this embodiment takes the form of a peristaltic pump. A length of flexible tubing 103 exits the pump and is attached to a snorkel 104, which is shown in a position of temporary storage.

To use the watering can 100 to extract water from a vessel (not shown), the snorkel 104 is withdrawn from a receiving feature 105 and inserted into the vessel containing the water to be extracted. The snorkel 104 should be inserted down to the bottom of the vessel. At that time, a crank handle 106 should be rotated in a clockwise direction which will cause a suction to be established in the tubing 103 and snorkel 104. The suction pulls the water through the snorkel 104 and tubing 103 into the pump 102 and the water exits through hole 107 into the body of the watering can.

Figure 2A:
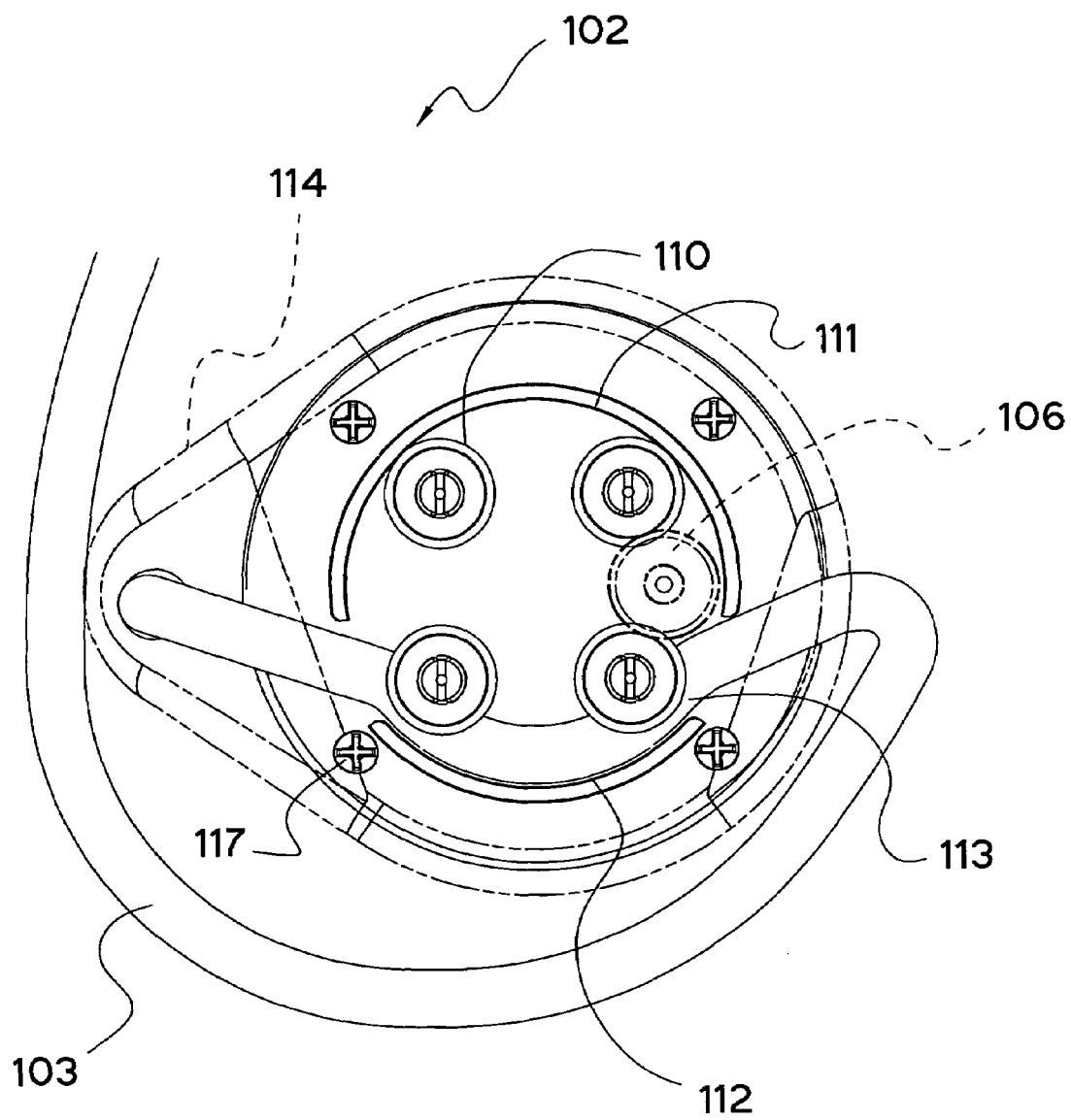
FIG. 2a is a side view of FIG. 2.

The pump functions in the following manner to produce suction in the tubing. Referring to FIGS. 2 and 2a where the pump cover 114 and drive plate 108 have been shown transparent with phantom lines, the crank handle 106 is attached to a pump drive plate 108 with a feature 109 which allows for the free rotation of the crank handle as the pump drive plate 108 is rotated. The pump drive plate also has at least two rollers 110 which may actually be the same component as the crank handle 106 in order to reduce the number of different components used to construct the device. The rollers 110 are free to rotate in the pump drive plate 108. As the drive plate is rotated, the rollers ride on surface 111 where they act as rolling bearings, guiding the motion of the rotating drive plate 108 and reducing the friction in the assembly as it rotates. When a roller 110 leaves the guide surface 111, they encounter the flexible tubing 103 and pinch the tubing between the roller and another guiding surface 112. The roller 110 and guiding surface 112 must be in close enough proximity that they pinch the flexible tube 103 enough to affect a fluid-tight seal or near-fluid-tight seal between the pinched walls of the tube. The pinched area of the tube is shown as item 113. As the drive plate 108 rotates and the roller 110 rolls along the tubing 103, the movement of the pinched portion of the tube 113 pushes water or air in the direction towards the exit hole 107 where it enters the body of the watering can.

While the guiding surfaces 111 and 112 act to guide the rotating elements in the direction radial to their rotation, the body of the watering can and the cover 114 act to retain the rotating elements in the axial direction. The opening in the cover 114 where the flexible tubing 103 exits the cover is made to pinch the tube in order to keep the tube from moving in the pump over time. One skilled in the art can see that various features in the cover 114 might accomplish this goal. The cover 114 is retained by screws 117 which might by replaced by snap features.

After the operator of the device is satisfied with the amount of water extracted from the vessel, the snorkel 104 can then be stowed again in the feature provided 105. The handle 115 can be used to pick up the watering can and pour the water through the spout 116 into a sink or other place of disposal. At that time, fresh water can be poured into the watering can and that water can be poured into the vessel using the spout 116.

In this embodiment, a preferred material for all parts is plastic. The body of the watering can 101 may be blow molded while all other parts might be injection molded. The body component 101 may be connected to the pump base component 118 by a process such as ultrasonic welding or adhesive bonding using features 119 and 120 to orient the components.

One skilled in the art will note that the amount of water pumped per revolution of the crank is directly related to the size of the tubing used and the diameter of the pump (surface 111). To augment the volume flow rate of the pump without increasing its size, a pair of gears (not shown) could be added between the crank 106 and drive plate 108 to increase the number of rotations of the drive plate 108 per revolution of the crank 106.

Figure 4:
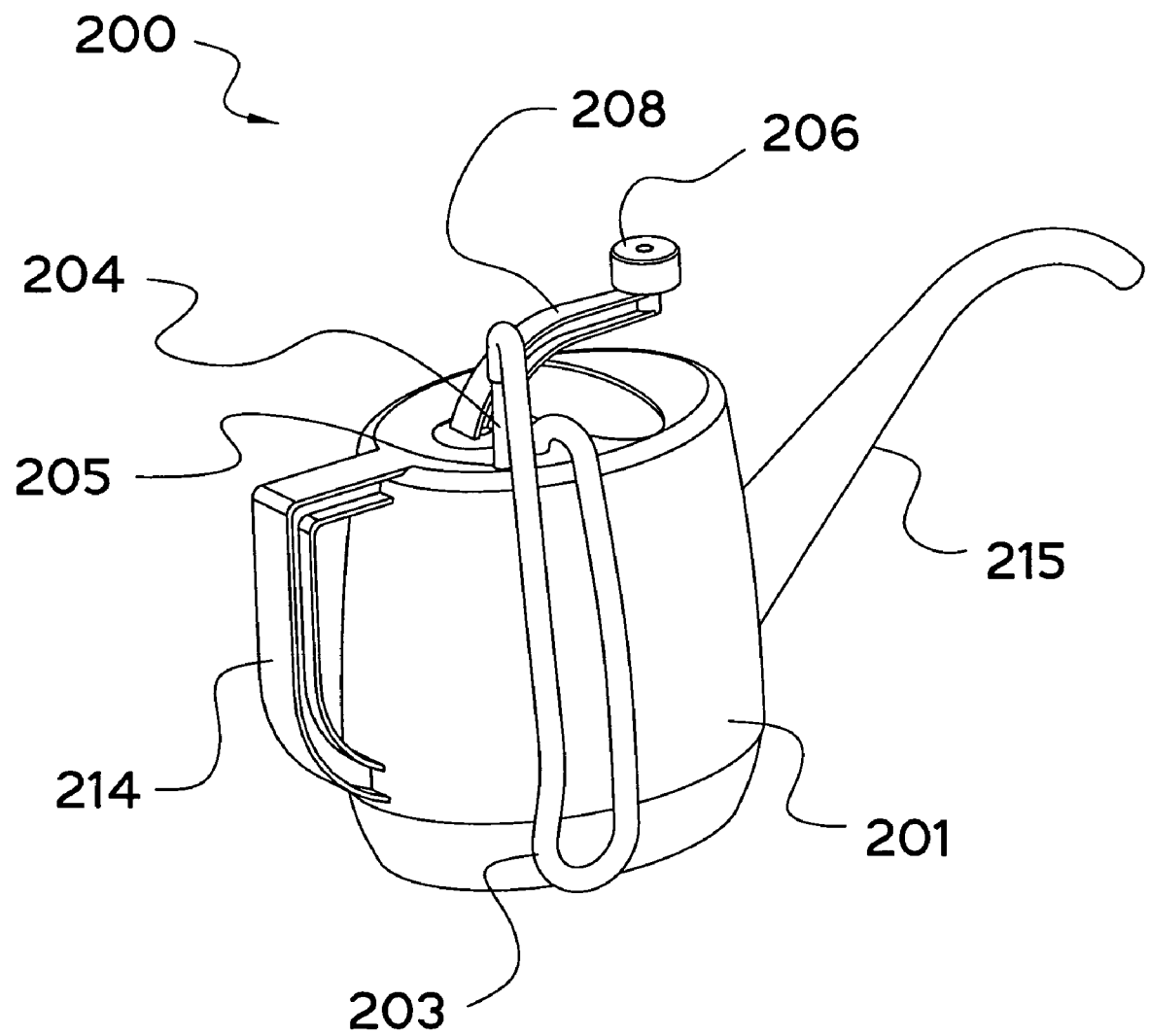
FIG. 4 is a perspective view of a first alternative embodiment.
Figure 5:
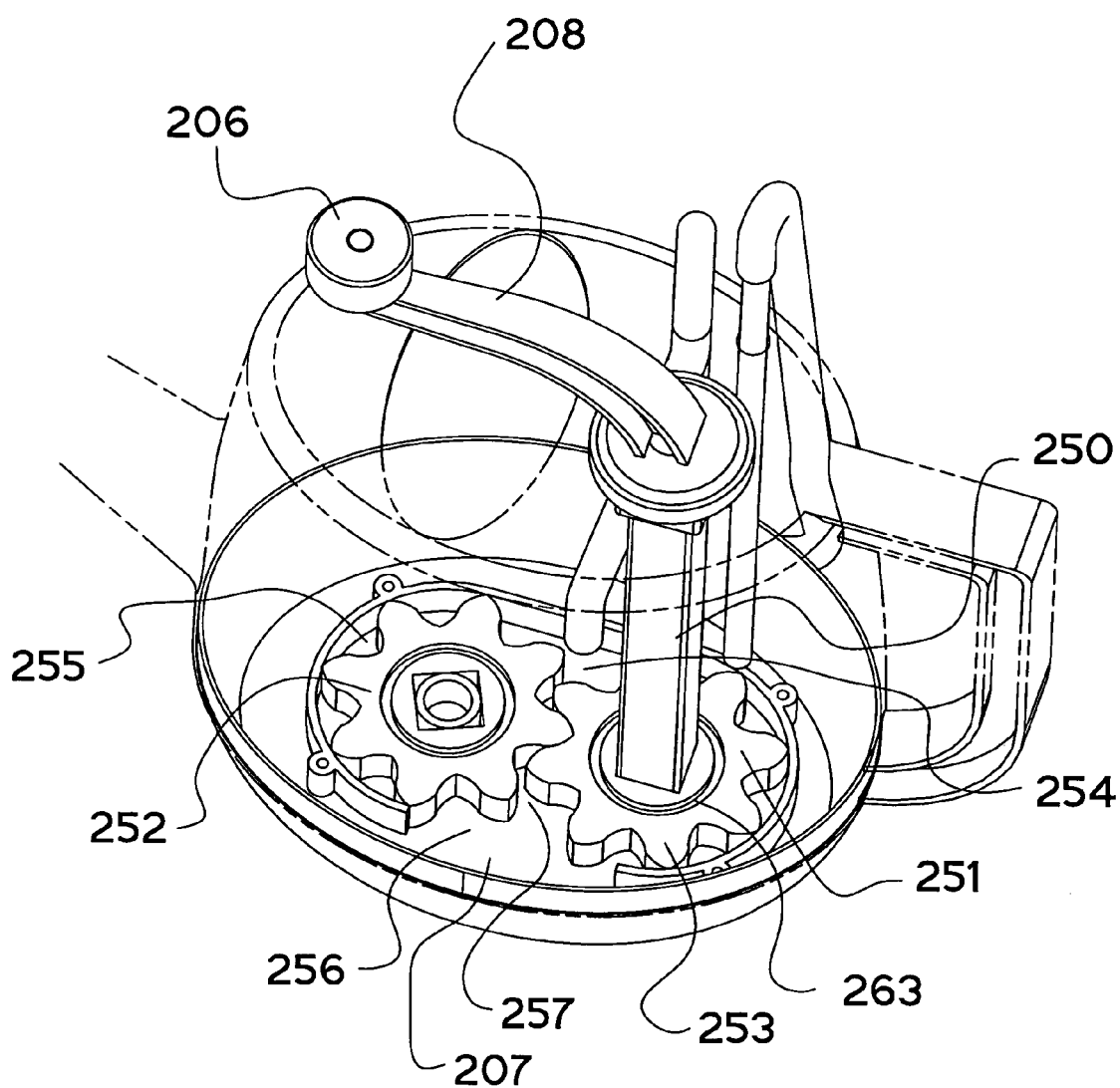
FIG. 5 is a perspective detail view of FIG. 4 with the body component and the pump cover component appearing transparent in order to see more clearly how the device operates.
Figure 6:
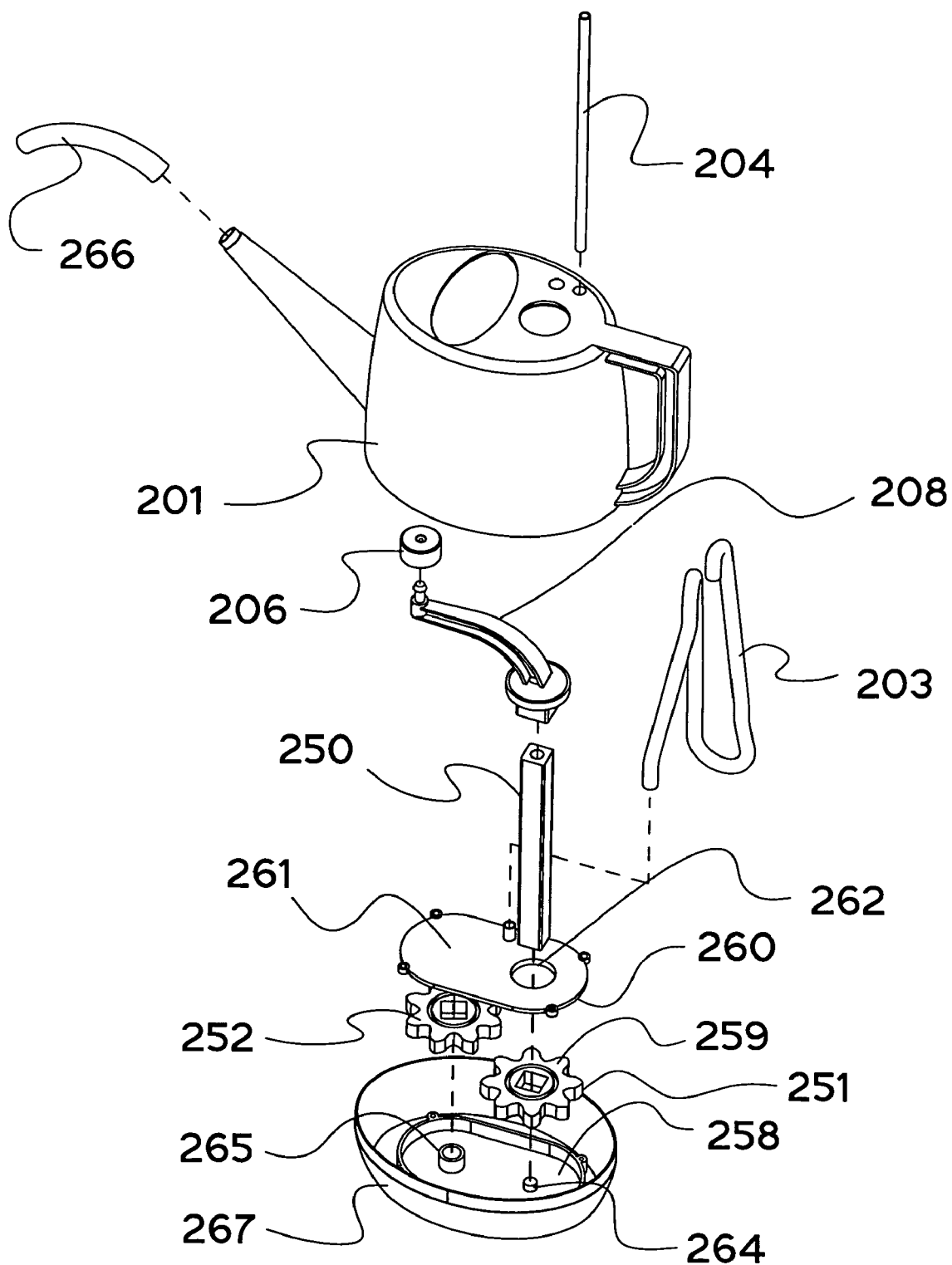
FIG. 6 is an exploded view of FIG. 4.

A first alternative embodiment watering can 200 shown in FIGS. 4-6 uses a different type of pump and also has a different construction than watering can 100. To use watering can 200 to extract water from a vessel, a snorkel 204 is withdrawn from a receiving feature 205 and inserted into the vessel containing the water to be extracted. The snorkel 204 should be inserted down to the bottom of the vessel. At that time, a crank handle 206 should be rotated in the clockwise direction which will cause a suction to be established in tubing 203 and snorkel 204. The suction pulls the water through the snorkel 204 and tubing 203 into a gear pump and the water exits through opening 207 into the body of the watering can.

The gear pump of the first alternative embodiment functions in the following manner to produce suction in the tubing. The crank handle 206 is attached to a pump drive crank 208 with a feature which allows for the free rotation of the crank handle as the pump drive crank 208 is rotated. As the pump drive crank is rotated in a clockwise direction, it drives a pump drive shaft 250 which in turn drives a first pump gear 251 which then drives a second pump gear 252 using gear teeth 253. As the gear teeth rotate, water or air is drawn into cavity 254 as the teeth come out of mesh and the gaps between the teeth are exposed to the cavity. Water or air which enters the gaps between the teeth are taken into spaces 255 between the pump walls and the gear by the motion of the gear. Then, as the spaces 255 arrive at an exit cavity 256, the water or air is pushed out of the gaps between the teeth as the gears start to mesh at the location denoted as 257. Since more water or air is arriving all the time to the exit cavity 256, the water or air is forced to exit through the opening 207 into the body of the watering can.

One skilled in the art will note that such a pump needs to include some amount of sealing in order to function properly. In this embodiment the sealing is realized by close tolerances between surface 258 on the watering can base 267, surfaces 259 on the gears, and surfaces 260 on pump cover 261. A labyrinth seal is also formed by lip 262 on cover 261 which protrudes into slot 263 in the gear in order to form a seal where the pump drive shaft 250 enters the pump cover. One should note that in this design, both pump gears can be identical in design and symmetric for ease of assembly. The first pump gear rotates on the pump drive shaft 250 which uses the protrusion 264 as a bearing surface to rotate on. The second pump gear, 252 uses the protrusion 265 as a bearing surface.

After the operator of the device is satisfied with the amount of water extracted from the vessel, the snorkel 204 can then be stowed again in the feature provided 205. The handle 214 can be used to pick up the watering can and pour the water through the spout 215 into a sink or other place of disposal. At that time, fresh water can be poured into the watering can and that water can poured into the vessel using the spout 215. The spout on this embodiment is augmented by a swiveling spout tip 266, which can be twisted to change the direction of the water exiting the can.

This embodiment is to be made of plastic with all parts being injection molded except for the swiveling spout tip 266 which might be blow molded. The two halves of the watering can body might be sealed together using ultrasonic welding or an adhesive bond. This first alternative embodiment shows how a different pump technology can easily be adapted to the invention. Other possible pump technologies that could be used include using a flexible vane pump, diaphragm pump, or lobe pump.

Figure 7:
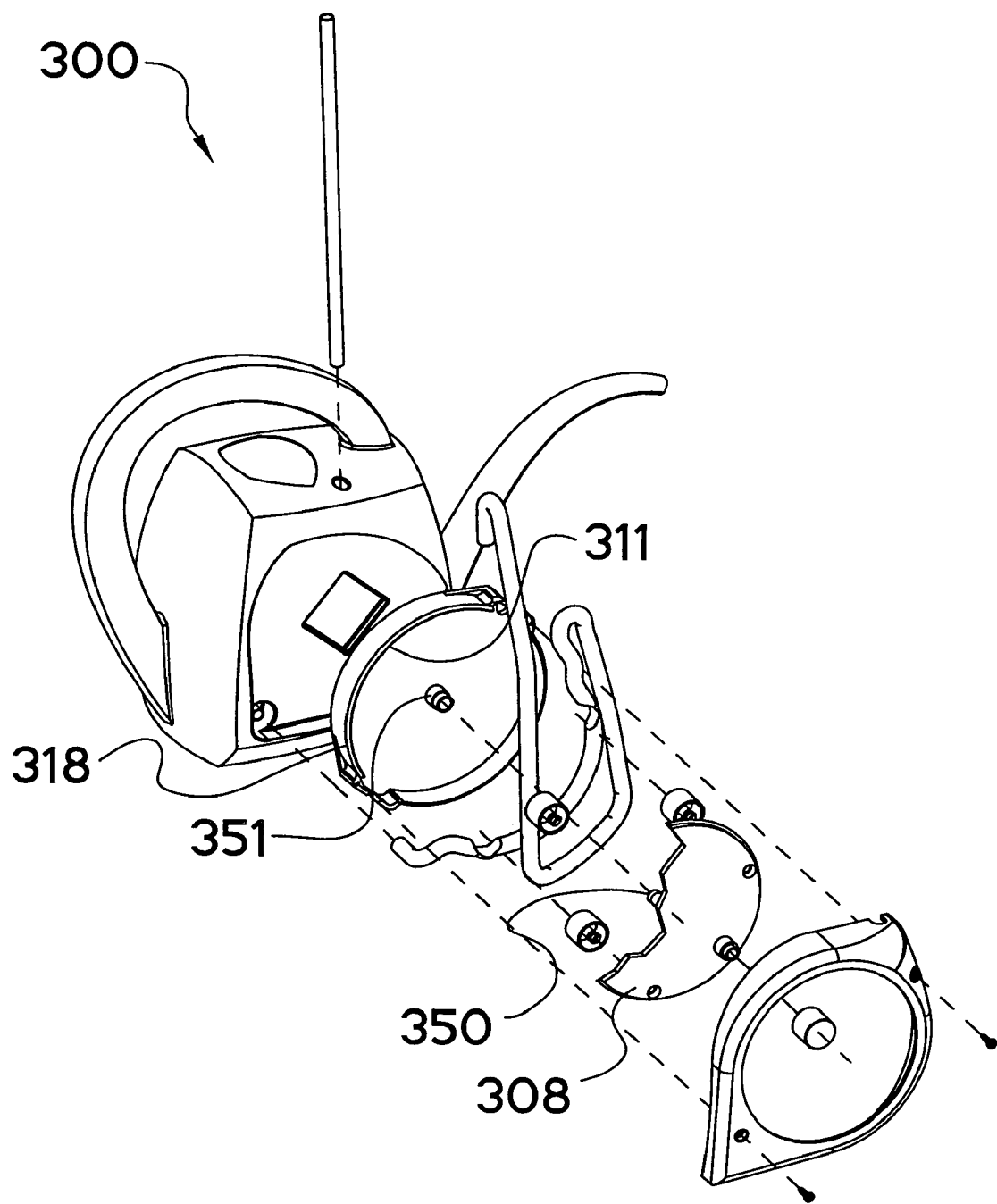
FIG. 7 is an exploded view of a second alternative embodiment watering can.

A second alternative embodiment watering can 300 as seen in FIG. 7 is almost the same as watering can 100 except for two things: 1) the relative size of the pump has been increased to increase the amount of flow per revolution of the crank; and 2) the surface 111 which was in contact with the rollers has been replaced with a surface 311 that is not in contact with the rollers and therefore not used as a bearing surface. Surface 311 is only present to add stiffness to the pump base component 318 and to make the component symmetric. Instead of the rotating elements being guided by surface 111, a small shaft-like feature 350 has been added to the drive plate 308 (which is shown partially cut away) to provide a bearing surface for the radial forces. In this case a cylindrical sleeve bearing feature 351 is added to the center of the pump base component 318 in which the shaft-like feature rides.

Figure 8:
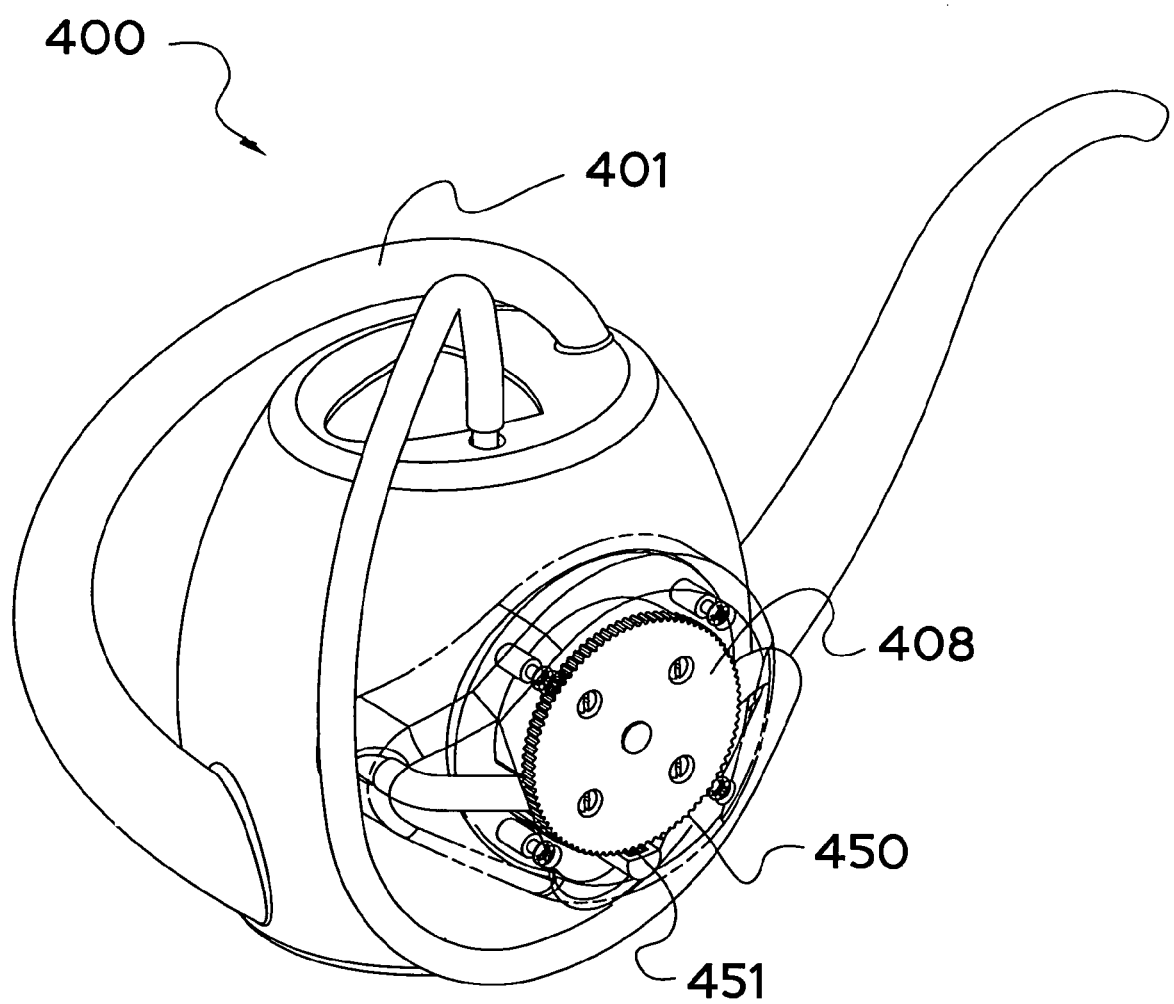
FIG. 8 is a perspective view of a third alternative embodiment with the pump cover shown transparent.
Figure 9:
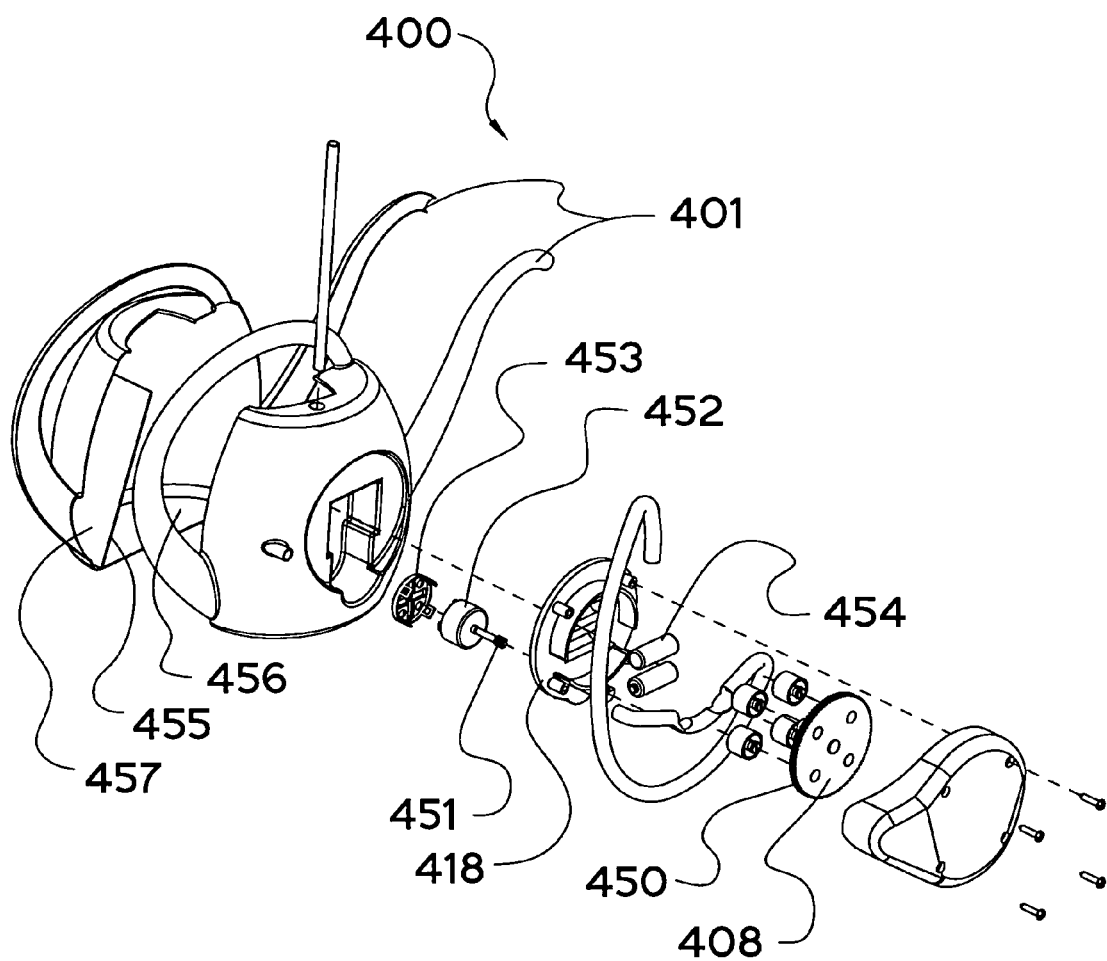
FIG. 9 is an exploded view of FIG. 8.
Figure 10:
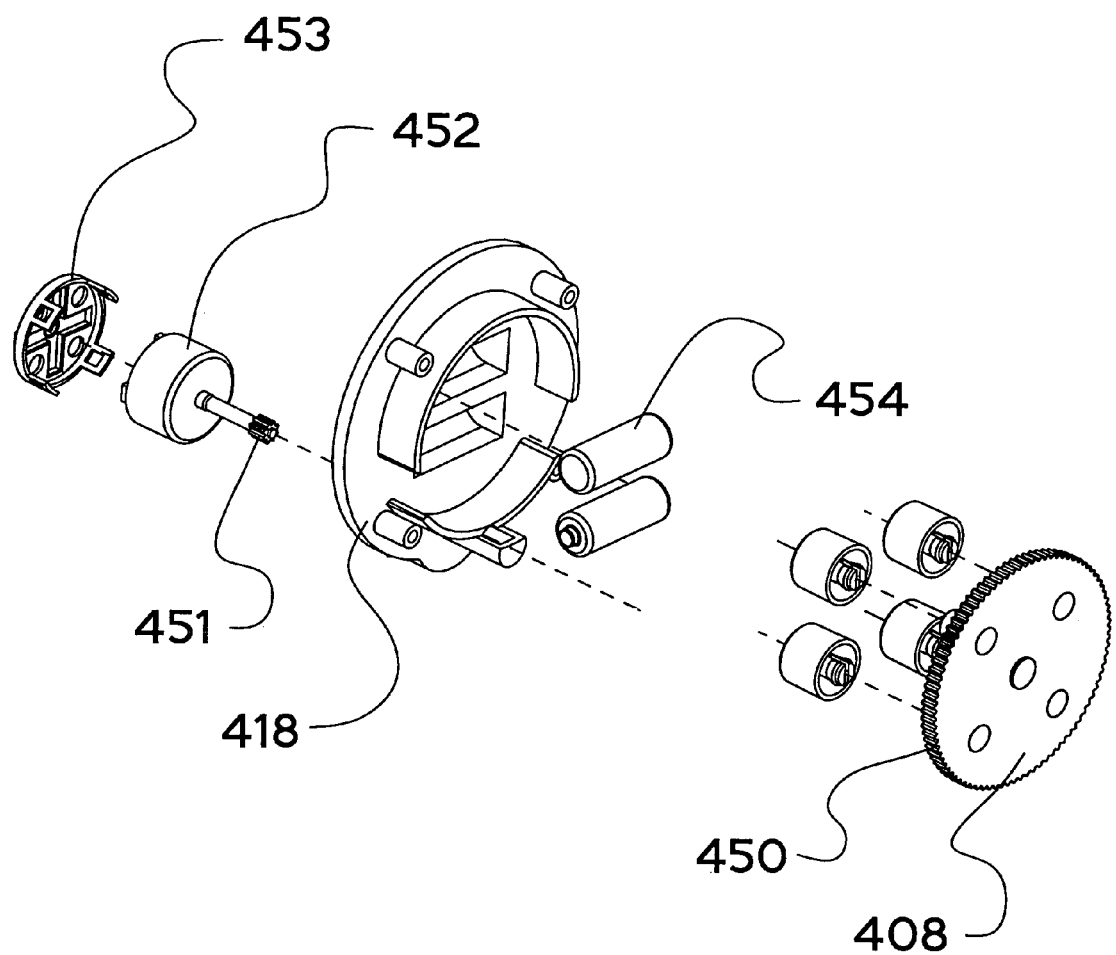
FIG. 10 is an exploded detail view of the motor drive components of FIG. 8.

A third alternative embodiment watering can 400 as shown in FIGS. 8-10 is also much like watering can 100 as well, but an electric motor with batteries has been substituted for the hand crank 106. The drive plate 108 of embodiment 100 has been replaced by a drive plate 408 which has gear teeth 450 around its perimeter. The gear teeth 450 mesh with the teeth on a smaller gear 451 which is connected to a motor 452 held into the pump base component 418 with a cap 453. Batteries 454 are also mounted in the pump base 418. A button would be provided in the handle of the watering can which would be connected by wires to the batteries 454 and motor 452 and used to turn the motor on and off. A second button could be used to reverse the direction of the motor so that the snorkel device could be used to distribute water as well.

Watering can body 401 can be made of two injection molded halves which are bonded together in the middle. This allows a divider 455 to be added to divide the inside of the watering can body into two sections: one for clean water 456, and one for dirty water 457. This could possibly eliminate a trip to the sink if the amount of water to be changed were small. In that case, the user would fill the compartment 456 with an amount of clean water that does not reach the top of the divider 455. When the pump is used, the dirty water goes into chamber 457 and the clean water can be poured into the flowers without returning to the sink to empty the dirty water (provided that the dirty water is not of such a quantity that it will spill over the divider 455 during pouring). The divider is situated in the can at an angle such that both chambers can be drained via the spout and therefore the entire volume of the watering can can be used normally (filled with clean water) if desired.

Figure 11:
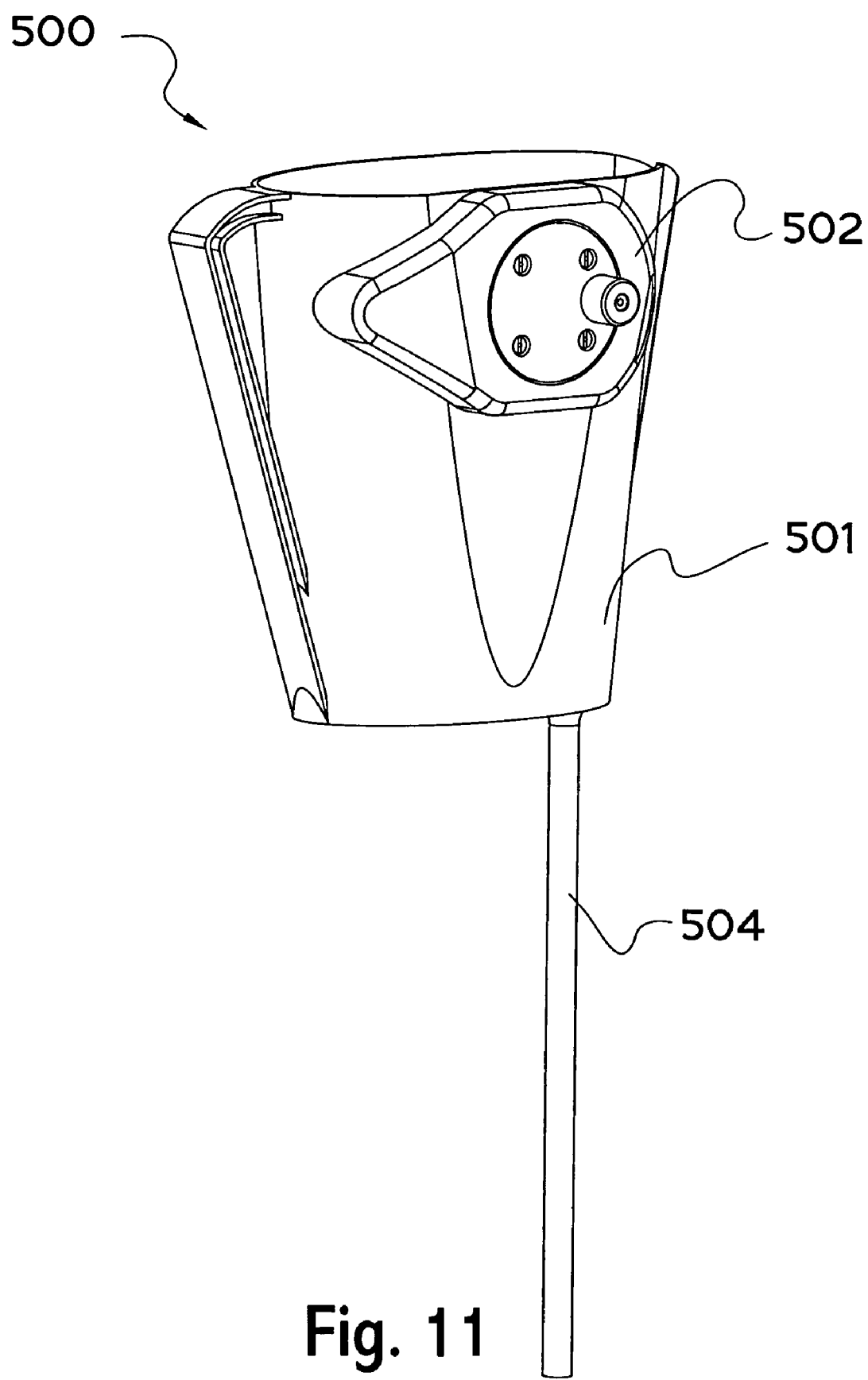
FIG. 11 is a perspective view of a fourth alternative embodiment.

A fourth alternative embodiment watering can 500 as seen in FIG. 11 shows that the body component 501 of the watering can may be of substantially different design and that snorkel 504 could be connected to the bottom of the watering can body directly in order to construct an embodiment where the watering can can be held above the flower arrangement with one hand while the other hand is used to pump. The rigid tube snorkel 504 could be affixed permanently with adhesive or spin welding, or it could be removable and include a sealing element which allowed it to be replaced and form a water-tight seal. The rigid tube snorkel 504 is connected to the pump 502 by flexible tubing, which is not visible in FIG. 11.

Figure 12:
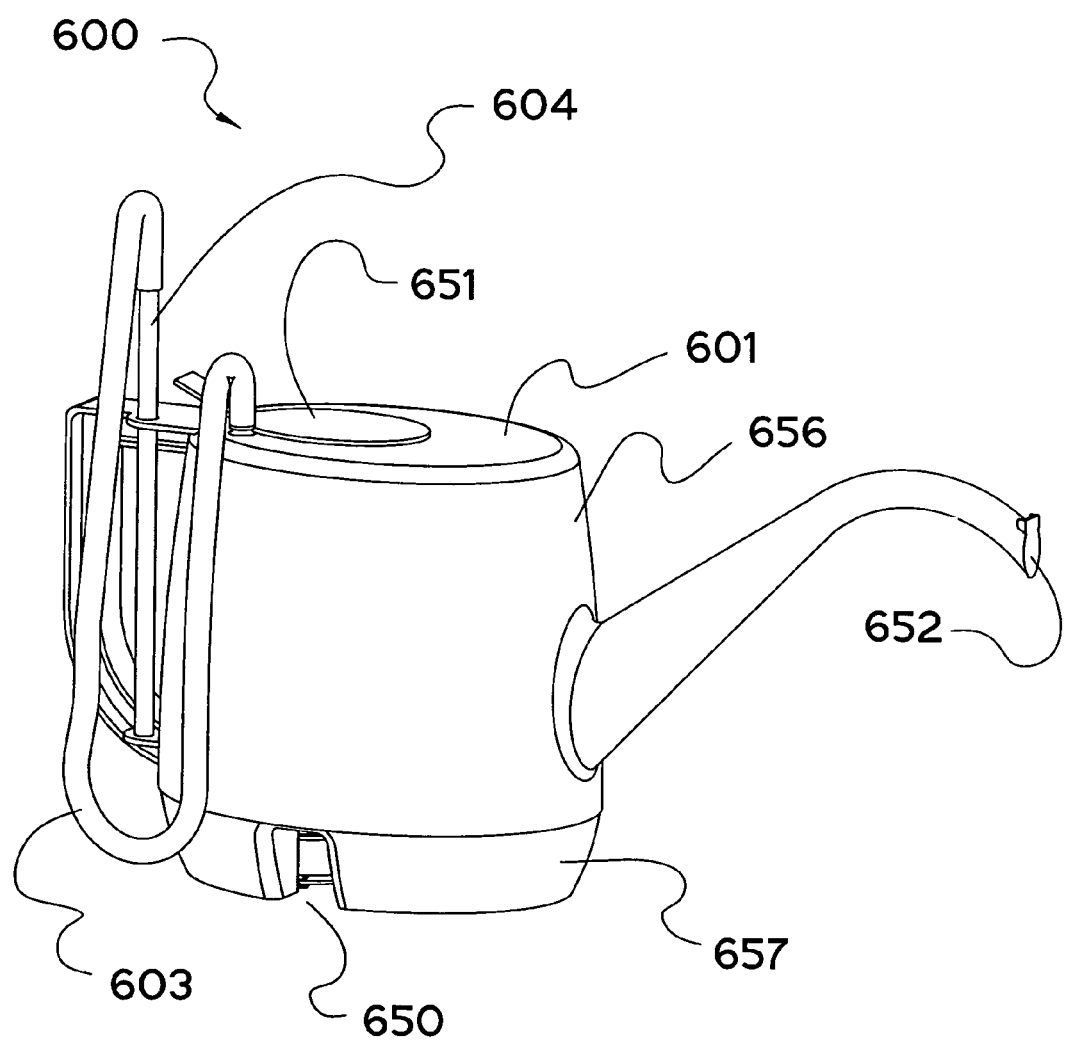
FIG. 12 is a perspective view of a fifth alternative embodiment.
Figure 13:
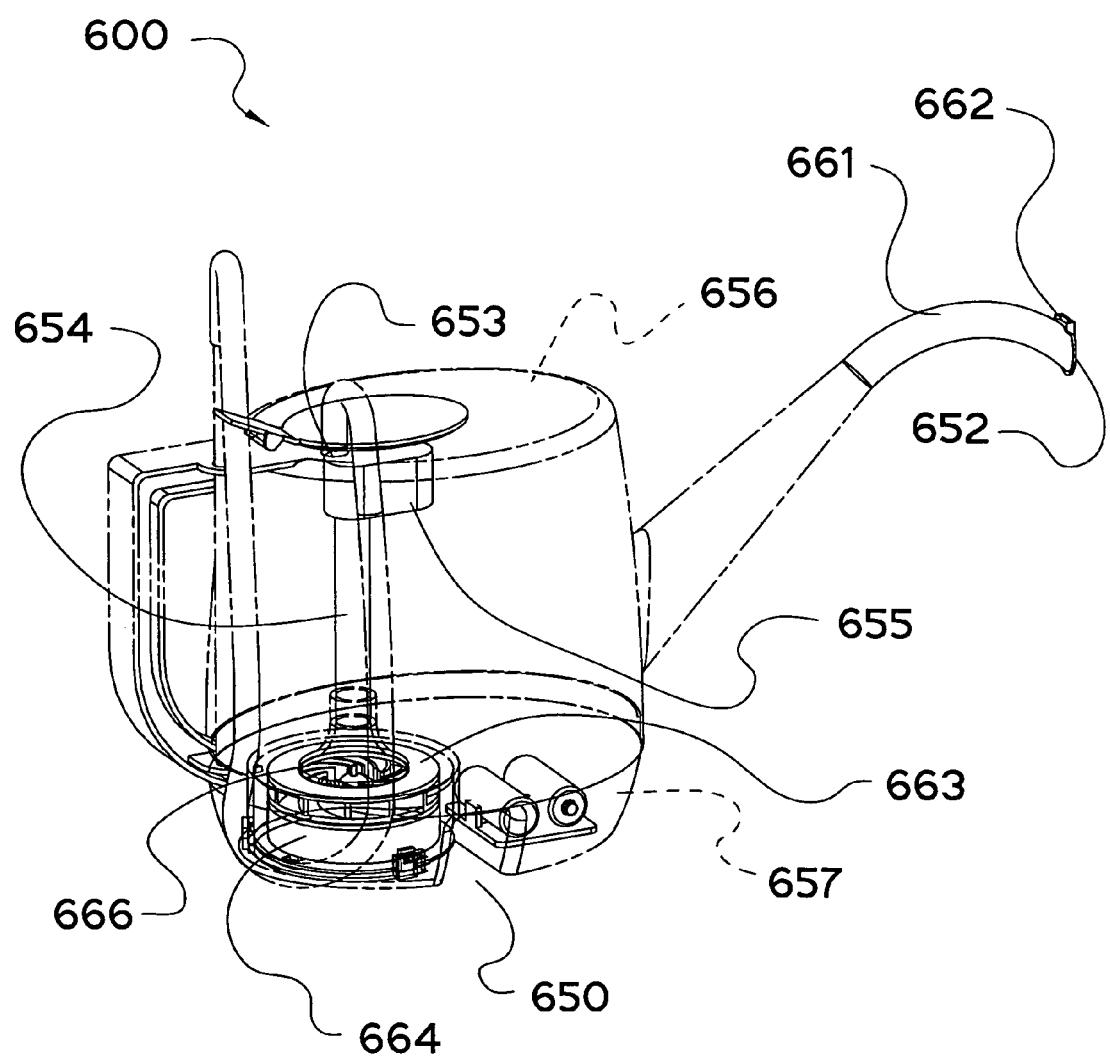
FIG. 13 is a perspective view of FIG. 12 with some components shown transparent for clarity.
Figure 14:
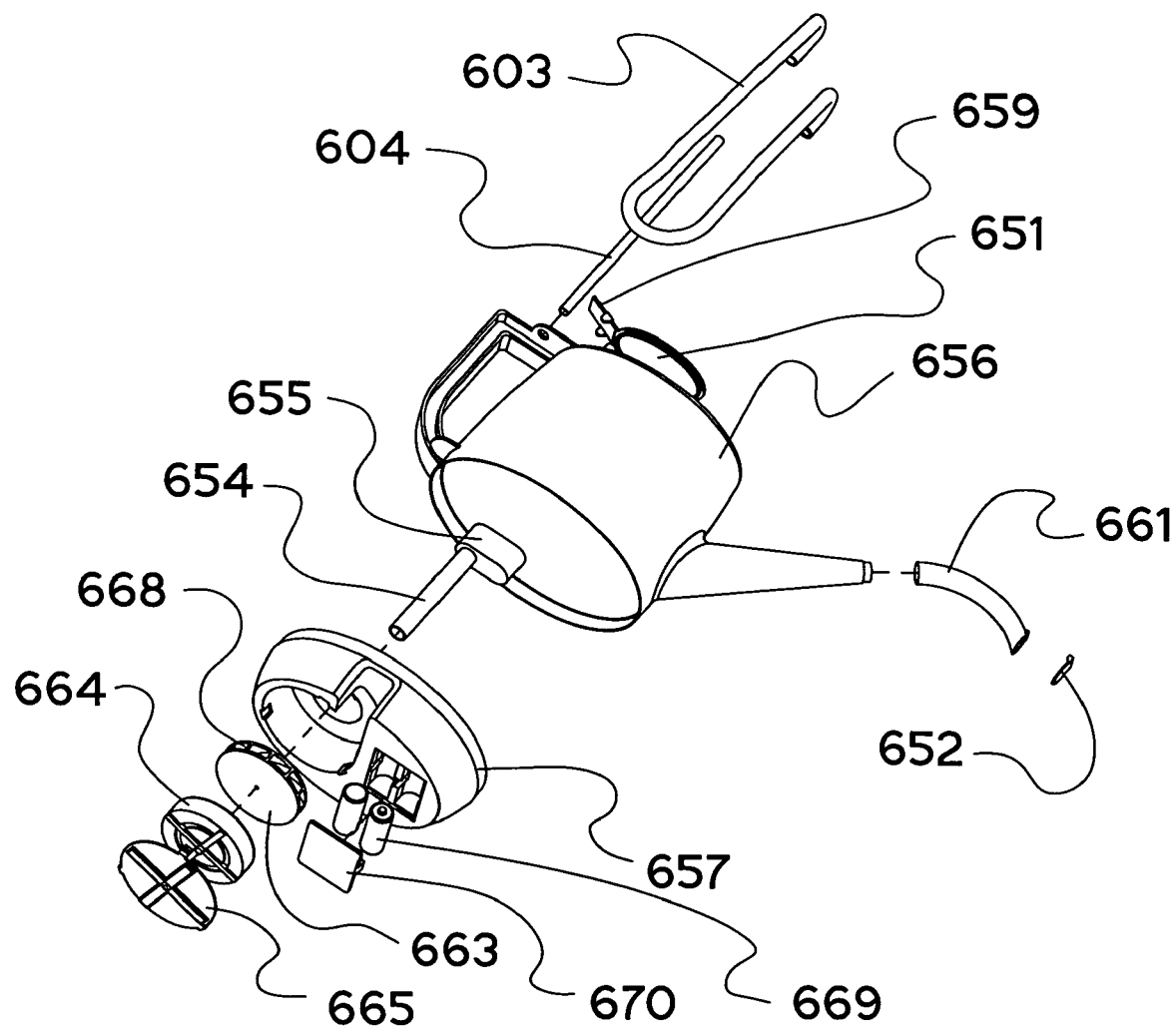
FIG. 14 is an exploded view of FIG. 12.

A fifth alternative embodiment watering can 600 as shown in FIGS. 12-14 is very different from the other embodiments in that the medium, which is pumped through the pump, is air rather than water. In this embodiment, watering can body 601 is actually a vacuum chamber in which a vacuum is established by a centrifugal blower which removes air from the inside of the watering can and blows it out an exit port 650 in the bottom of the can. Because chamber doors 651 and 652 will seal the other entrances through which air or water could enter the can, air or water will be forced to enter through snorkel 604. As air and water flow through flexible tubing 603 and enter the chamber through opening 653, the water falls to the bottom of the chamber but the air enters the centrifugal blower through blower entry tube assembly 654. This assembly has a float ball check valve assembly 655 which prevents water from entering the blower in the event that the chamber is over filled with water. The blower entry tube assembly may also include a filter where the air enters the float ball check valve assembly to prevent solid debris from entering the blower.

The fifth alternative embodiment is constructed as follows. The body of the watering can is made up of two components 656 and 657 (both shown transparent in phantom lines in FIG. 13). The upper component 656 includes a hinge pivot feature which allows the chamber door 651 to pivot when a persons thumb presses down on the surface 659 of the door 651. The upper component 656 also connects to a swiveling spout tip 661 just as in the second alternative embodiment. However, the swiveling spout tip 661 which includes a similar hinge pivot feature 662 where the door 652 pivots. The door 652 is intended to remain closed normally due to the force of gravity, opening only when the watering can is inclined to pour water.

The lower component of the watering can body 657 provides a housing for the blower, motor, and batteries. The blower entry tube assembly 654 is assembled into an opening in the watering can body base component 657 with an adhesive or is ultrasonically or spin welded such that the parts have a water tight seal. A centrifugal blower impeller 663 is attached to the shaft of motor 664 which is held into the component 657 using a cap-like component 665. In operation, air enters the impeller 663 through the central opening 666 and is expelled from the openings along the perimeter 668. Batteries 669 are held into the component 657 using a snap-in cover 670.

The fifth alternative embodiment has an extra functionality in that it can be used in a limited fashion as a vacuum cleaner. This could be advantageous because it could allow the user to remove the pollen that often accumulates on the furniture underneath an arrangement of blooming flowers. This could be done before or after the water is sucked into the can.

Figure 15:
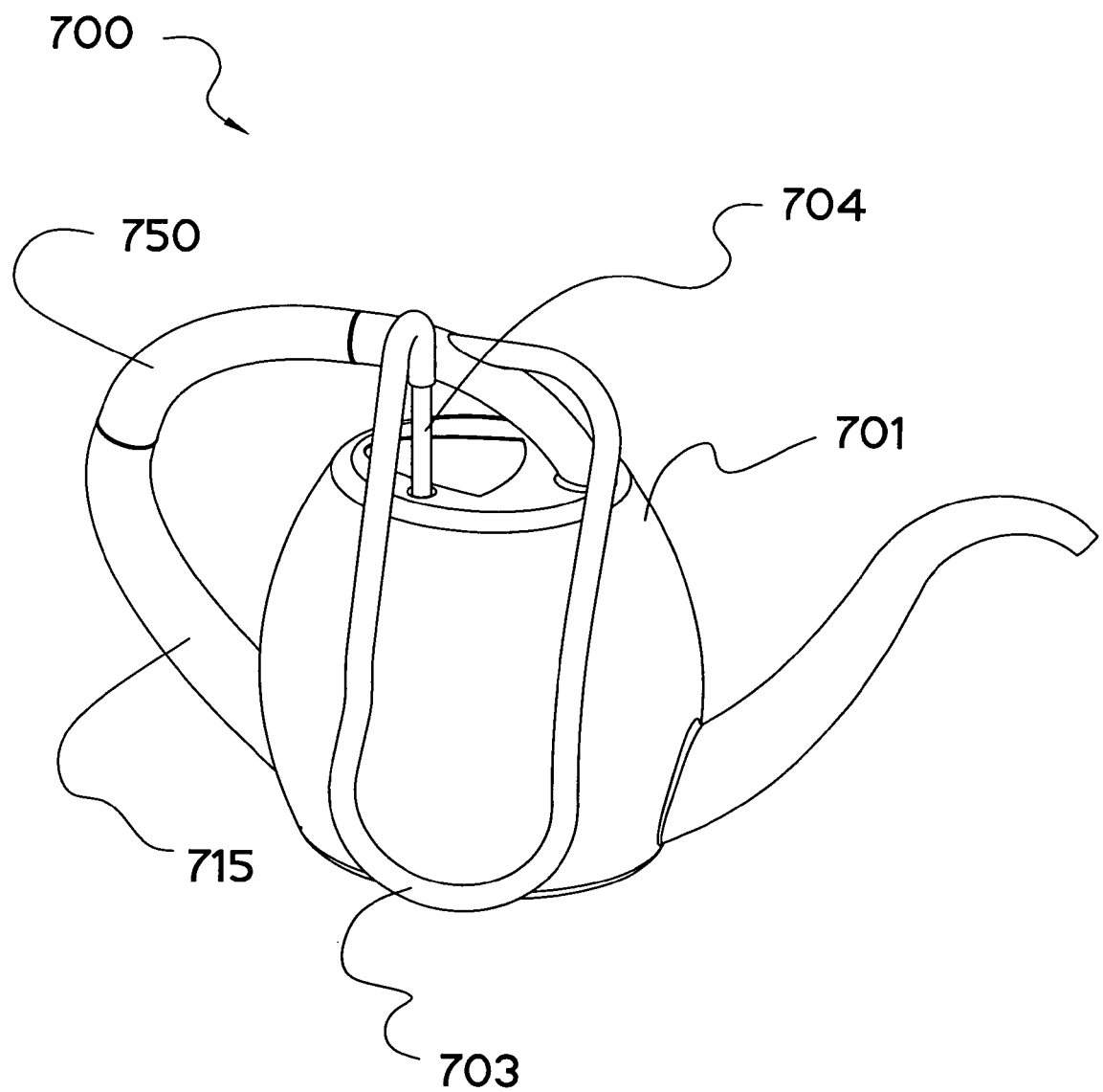
FIG. 15 is a perspective view of a sixth alternative embodiment.
Figure 16:
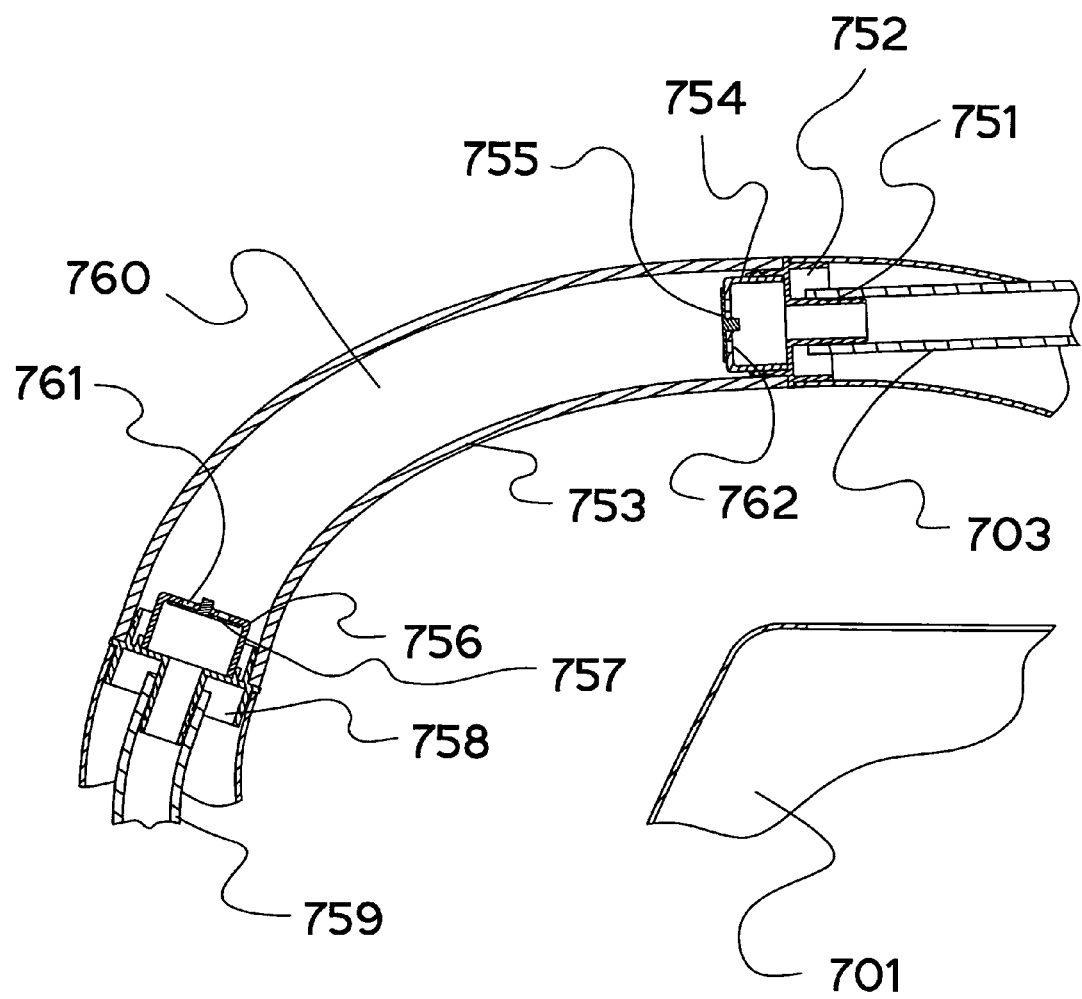
FIG. 16 is a partial cross sectional detail of the pump section of FIG. 15.
Figure 17:
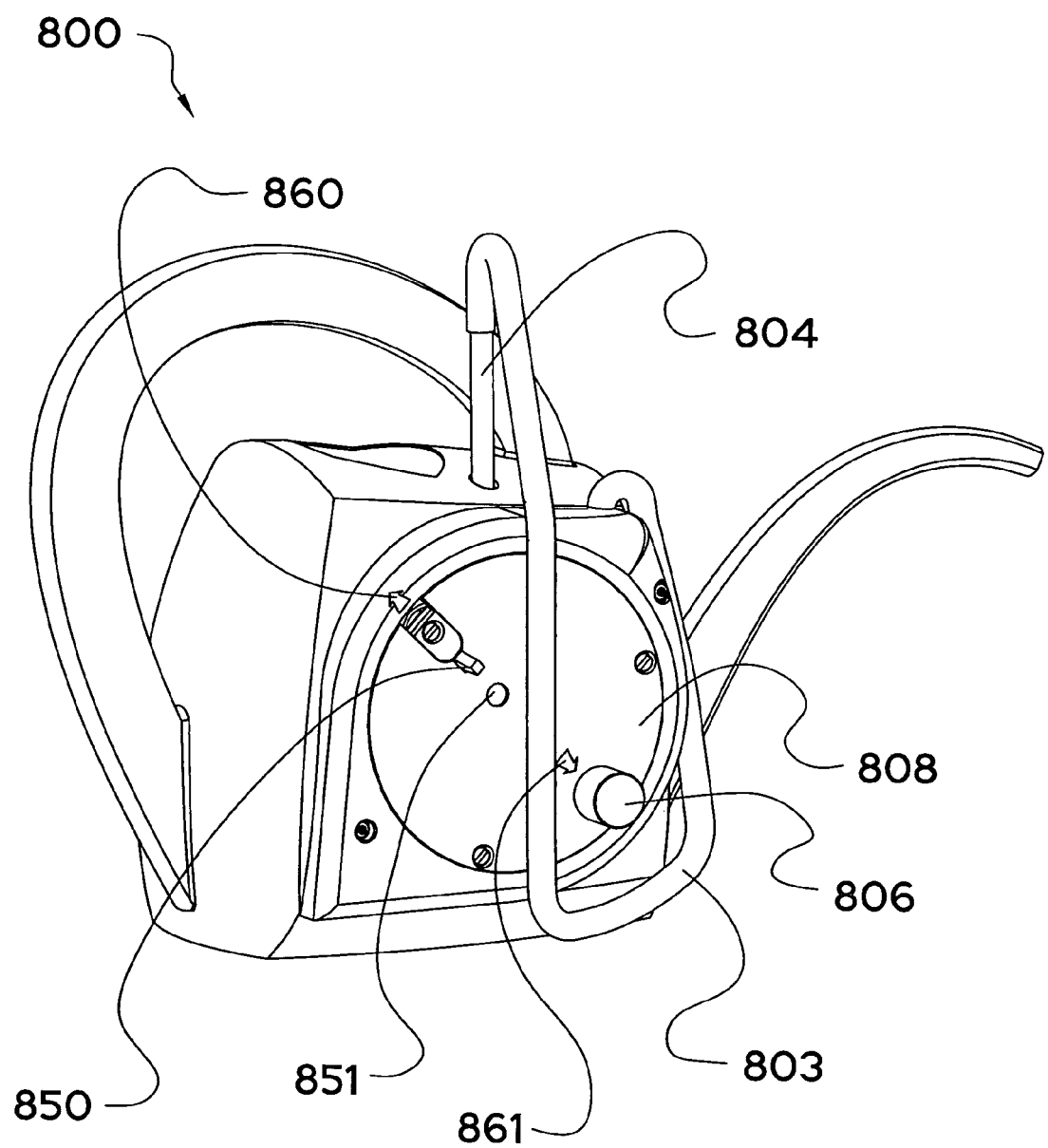
FIG. 17 is a perspective view of a seventh alternative embodiment.

A sixth alternative embodiment watering can 700 is shown in FIGS. 15 and 16 and uses a different type of pump and also is configured to employ siphoning action to extract water from the vessel. Watering can 700 has a handle 715, which has a flexible walled region 750 which can be squeezed with the hand to pump fluid from a flexible tube 703 into the body 701 of the watering can. To extract water from a vessel, a snorkel 704 is withdrawn from the receiving feature and inserted into the vessel containing the water to be extracted. The snorkel 704 should be inserted down to the bottom of the vessel. At that time, the flexible region of the handle 750 is squeezed with the hand such that it partially collapses and will cause a suction to be established in the tubing 703 and snorkel 704. The suction pulls the water through the snorkel 704 and tubing 703 into the watering can.

The pump is shown in cross section in FIG. 16 and is assembled in the following manner. The flexible tubing 703 terminates on a hose barb 751, which is part of the first pump end cap 752. The first pump end cap 752 is attached with a sealed connection to the flexible wall material 753, which is molded in a shape that matches the contour of the handle. A check valve consisting of a body component 754 and a flexible flap component 755 are also attached to the first pump end cap 752 in a manner that produces a watertight seal. The exit end of the pump is similar except that an identical check valve body 756 and flexible flap 757 are assembled in a different order into the second pump end cap 758 in order to produce a check valve which allows flow in the same direction. Another piece of flexible tubing 759 is attached to the second pump end cap 758 and proceeds down the handle into the base of the watering can. One skilled in the art will note that there are many ways to produce the water-tight seals mentioned above including using adhesives, using snap fits with o-rings, using different types of thermoplastic welding, and (for the flexible walled elements) using simple interference fits between the components.

The pump functions in the following manner to produce suction in the tubing 703. When the flexible wall material 753 is squeezed, it partially collapses forming pressure in the air or water which is inside the cavity 760. This pressure bears on the check valve flap 757 through the ports 761 in the check valve body 756. This pressure pushes the flexible flap 757 out of the way so that water or air exits the pump via the ports 761. When the operator relaxes the pressure on the flexible wall material 753, the material (being elastic) tries to spring back to its original shape. This causes a low pressure to form in the cavity 760. The difference in pressure between the cavity in the check valve body 756 and the cavity 760 causes the flexible flap 757 to spring back to its original shape and form a seal such that water or air that has just left cannot return to the cavity 760. However, the pressure difference between the cavity in the first check valve body 754 and cavity 760 will push the flexible flap 755 open so that water or air on the other side of the check valve will be exposed to the low pressure in cavity 760. Water or air therefore enters the cavity 760 through ports 762 until the flexible walled material 753 has returned to its original shape. At this point the process can be repeated.

The unique result of using such a pump is that the watering can can be used as a siphon to remove water from a vessel without needing to provide pumping action through the entire process. If the watering can is held at a level which is below the height of the water vessel being emptied, only a few squeezes of the flexible portion of the handle 750 will be necessary to start the siphon and empty the entire vessel. A few squeezes of the flexible region 750 will suck water into tube 703. After a substantial portion of tube 703 is filled with water, gravity will cause a positive pressure to form in the entrance of the pump in the check valve body 754 causing the check valve to open and water to flow through cavity 760, opening the second check valve and proceeding out of the pump via tube 759. The water leaving tube 703 via the pump will cause additional water to be drawn into tube 703 via snorkel 704.

In order to prevent debris in the water from causing the check valve flaps 755 and 757 to be held open, the snorkel 704 may require a screen of some sort to insure large objects do not enter. One skilled in the art will note that there are many different types of check valves that could be employed in this embodiment, some of which might be more resistant to fouling by debris than others.

A seventh alternative embodiment watering can 800 as shown in FIGS. 17-20 combines a robust peristaltic pump with siphoning action. Watering can 800 includes a trigger 850 and release button 851 which protrude from drive disk 808. The trigger 850 is used to retract one of the wheels from contact with the tube and therefore let water flow freely through the tube when siphoning.

Figure 18:
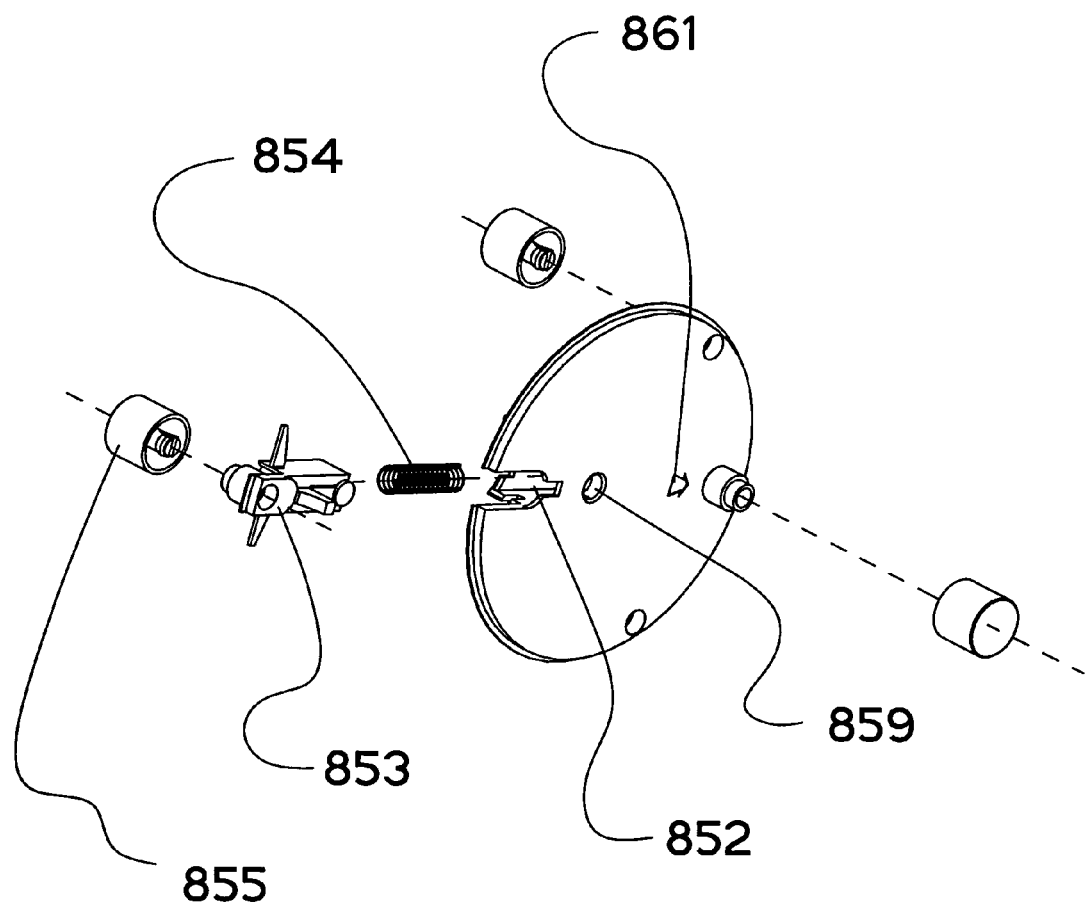
FIG. 18 is an exploded view of the pump drive disk assembly of FIG. 17.
Figure 19:
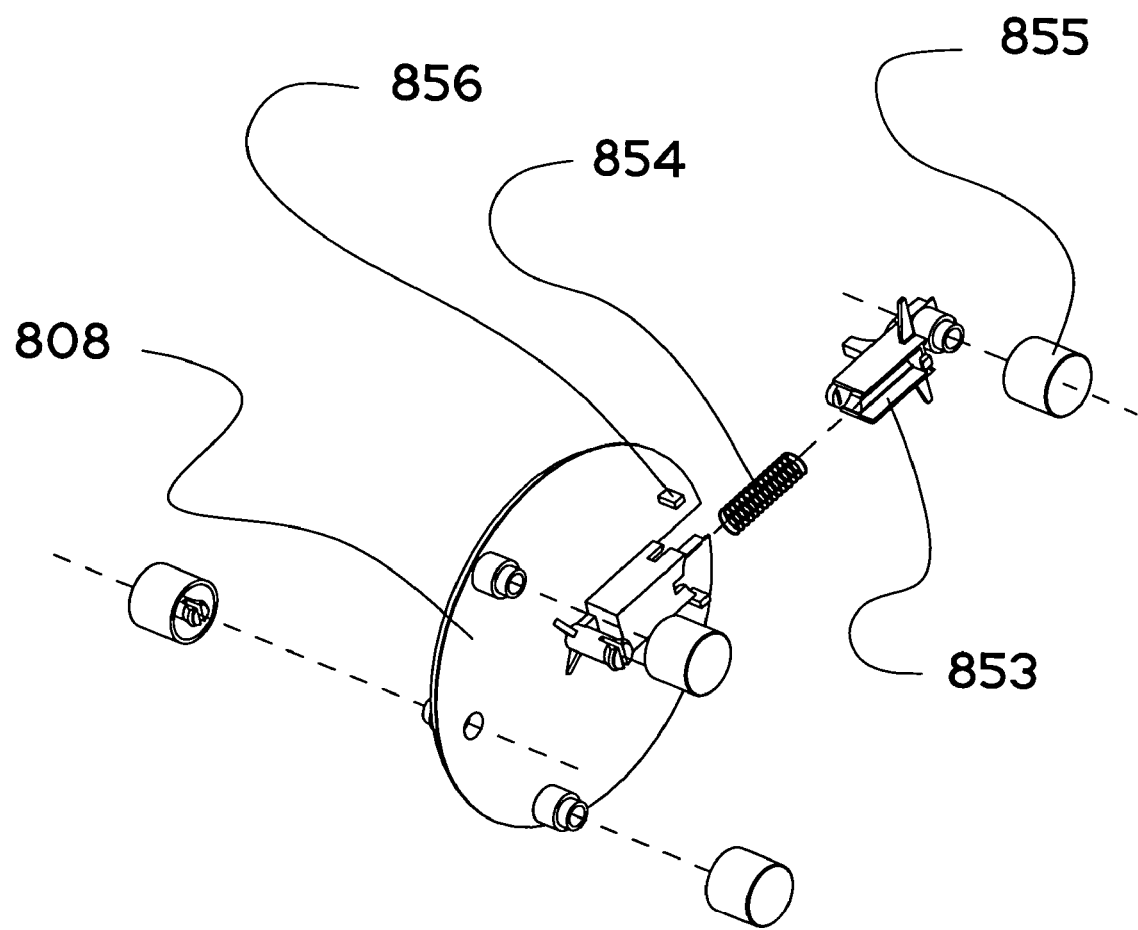
FIG. 19 is an exploded view of the pump drive disk assembly of FIG. 17 from a different angle.
Figure 20:
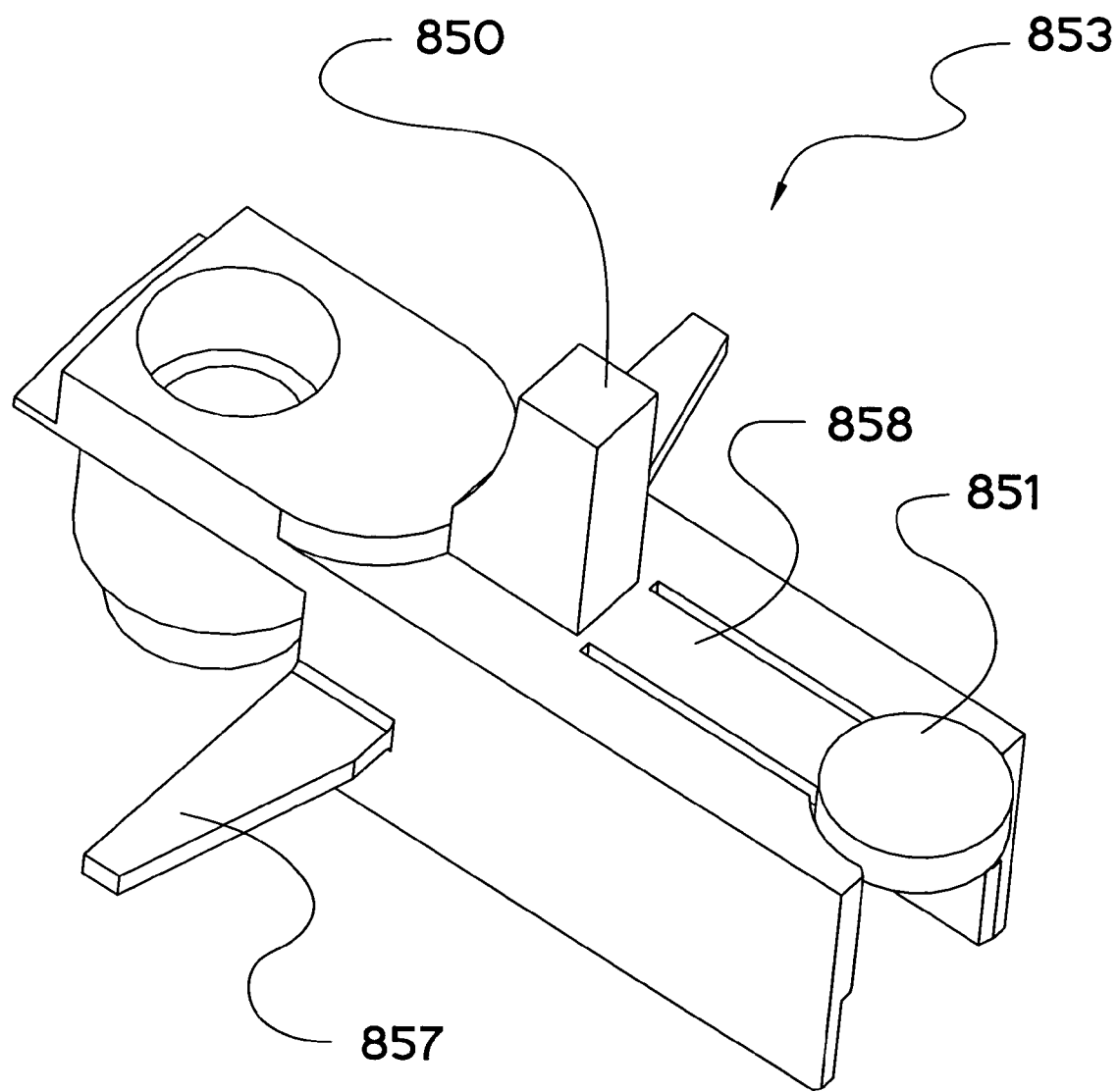
FIG. 20 is a perspective detail view of the roller mounting plunger of FIG. 17.

The modification to the pump of the seventh alternative embodiment only requires changes to the drive disk assembly and is shown in FIGS. 18-20. In FIG. 18, the drive disk assembly is shown in an exploded view. A modified drive disk 808 has been modified so that there is a pocket 852 in which a roller-mounting plunger 853 may slide. A spring 854 also is installed into the pocket 852 so that it bears on the roller-mounting plunger 853, providing a force which pushes roller 855 against the flexible tubing. The roller 855 only pushes against the flexible tubing during approximately 140 degrees of the rotation of the pump, and therefore, features need to be provided which cause the travel of the roller-mounting plunger 853 to stop before it interferes with other pump components when it is not riding on the flexible tube. This is accomplished by providing travel stops 856 on the disk 808 which encounter flexible beams 857 on the roller-mounting plunger 853. The beams 857 are made to be flexible such that they can be bent to allow the roller-mounting plunger 853 to be inserted into the pocket 852 during assembly. The beams 857 should not bend significantly during operation however.

The release button 851 is mounted on a flexible beam 858 which provides a force that pushes the button into a buttonhole 859. When the roller-mounting plunger 853 is pushed into pocket 852 as far as it can go using the trigger 850, the button 851 is forced into the buttonhole 859 on disk 808 by the elasticity of the beam 858. The button then holds the roller-mounting plunger 853 at the far end of the pocket even after the force on the trigger 850 is released. The roller-mounting plunger 853 will then only move when the user depresses the button 851 to release it. Arrows 860 and 861 are purely cosmetic and are molded into the pump cover and the drive disk to aid the user in proper operation.

The pump of the seventh alternative embodiment is used in the following manner to evacuate a vessel of water. The process is started by pressing the release button 851 in order to insure that the roller mounting plunger 853 is in its outward position and in contact with the flexible tube 803. The snorkel device 804 is put into the vessel from which water is to be evacuated so that the snorkel extends all the way to the bottom of the vessel. The watering can is held at a level which is below the height of the water vessel being emptied. The crank handle 806 is cranked in the clockwise direction in order to draw water into the snorkel 804 and tube 803. After a substantial portion of tube 803 is filled with water, gravity will cause a positive pressure to form in the entrance of the pump. At this time, the user can position the crank handle 806 such that the arrow 860 and the arrow 861 are approximately aligned with each other (approximately 180 degrees from the orientation shown in FIG. 17). Then the user pulls the trigger 850 towards the crank handle 806 until the button 851 clicks into the buttonhole 859, thereby holding the roller-mounting plunger 853 and roller 855 back away from the flexible tube. This removes the pinch point from the flexible tube and therefore allows the water to flow freely under the influence of gravity. The water leaving tube 803 into the watering can will cause additional water to be drawn into tube 803 via snorkel 804. This process will continue until the vessel is completely evacuated of water and air starts to enter the snorkel 804.

It is possible to add features to the roller-mounting plunger 853 and to the pump base component (analogous to component 318 of FIG. 7) such that the roller-mounting plunger 853 could not be moved unless the crank handle 806 were in the position with the arrows aligned and thereby eliminate user confusion about what position the crank should be in when operating the trigger.

Figure 21:
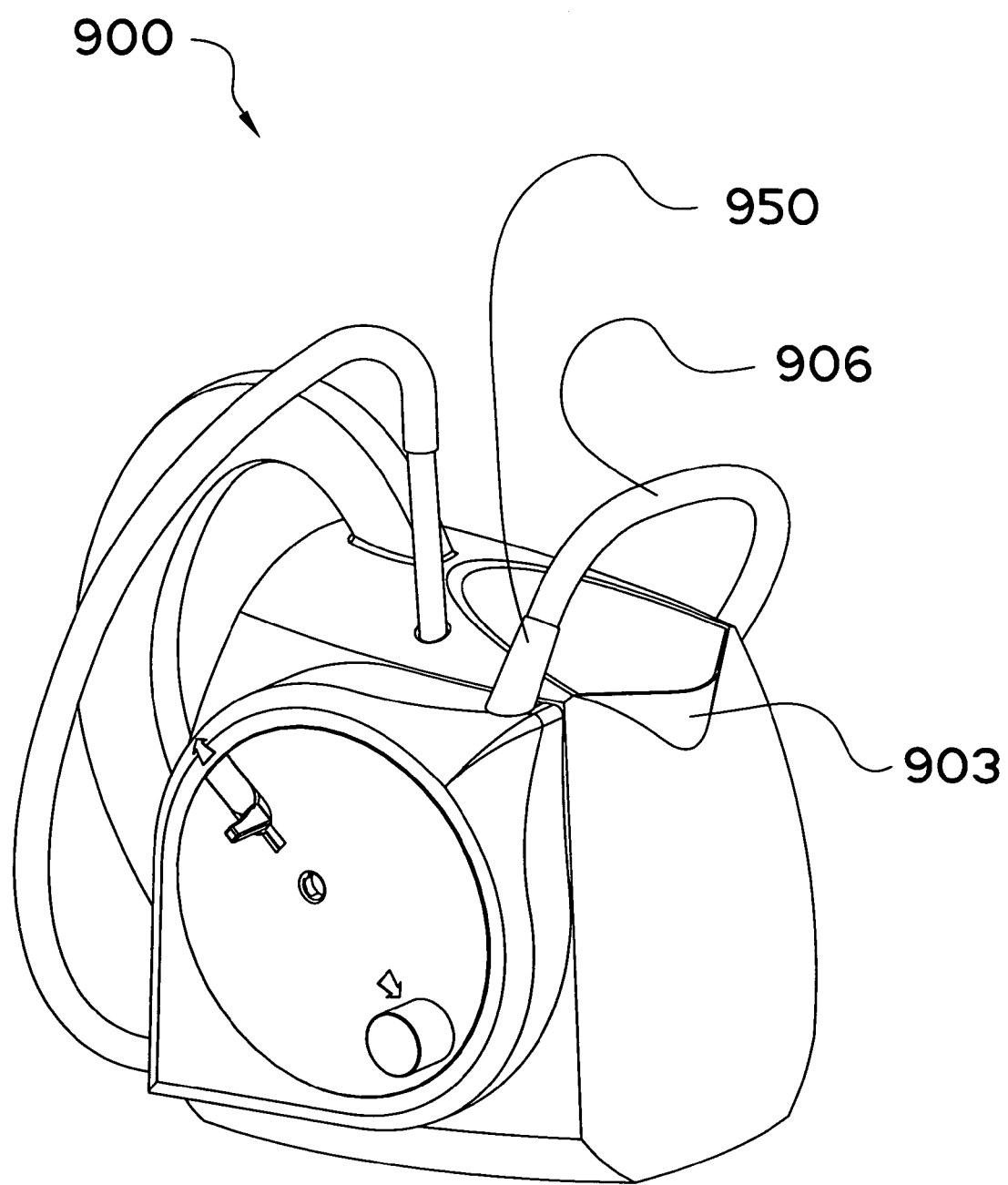
FIG. 21 is a perspective view of an eighth alternative embodiment water can.
Figure 22:
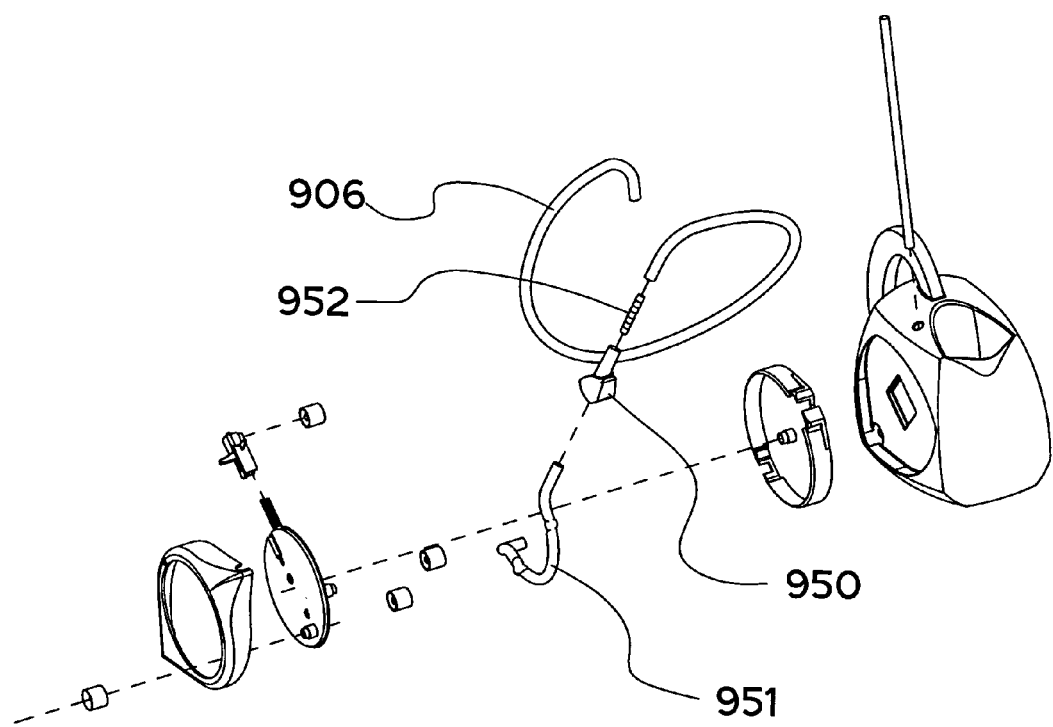
FIG. 22 is an exploded view of FIG. 21.

An eighth alternative embodiment watering can 900 is shown in FIGS. 21 and 22 and is much like the seventh alternative embodiment except for two differences. In the overall view of FIG. 21, one can see that the eighth alternative embodiment 900 has been modified by abbreviating spout 903 so that the shape of the body is more like an ordinary water pitcher. This might make this version more useful for ordinary household chores like changing fish bowl water or changing the water in a birdbath or indoor fountain. Also seen in FIG. 21 is a rubber strain relief 950 which surrounds the flexible tubing 906 where it enters the pump on the side of the can. This rubber strain relief not only protects the flexible tubing 906 but it hides a junction between it and another piece of flexible tubing 951 seen in FIG. 22. The two pieces are joined together using an ordinary barbed hose union 952. Having this juncture between two different hoses 906 and 951 allows the designer to pick tubing with different properties for the external flexible tube and the internal flexible tube 951, which is part of the pump. This is advantageous since the required properties of the two different pieces of tubing are very different.

Figure 23:
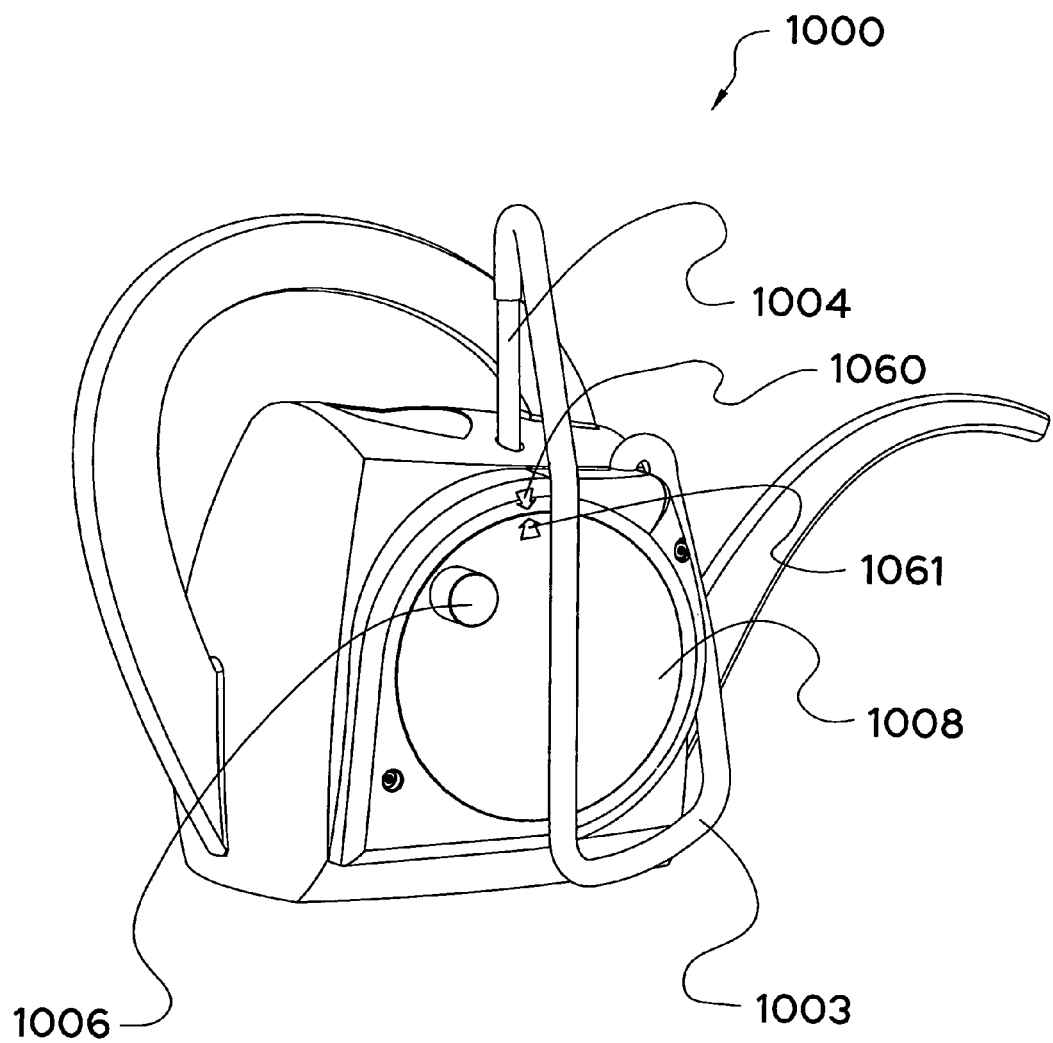
FIG. 23 is a perspective view of a ninth alternative embodiment watering can of the present invention.
Figure 24:
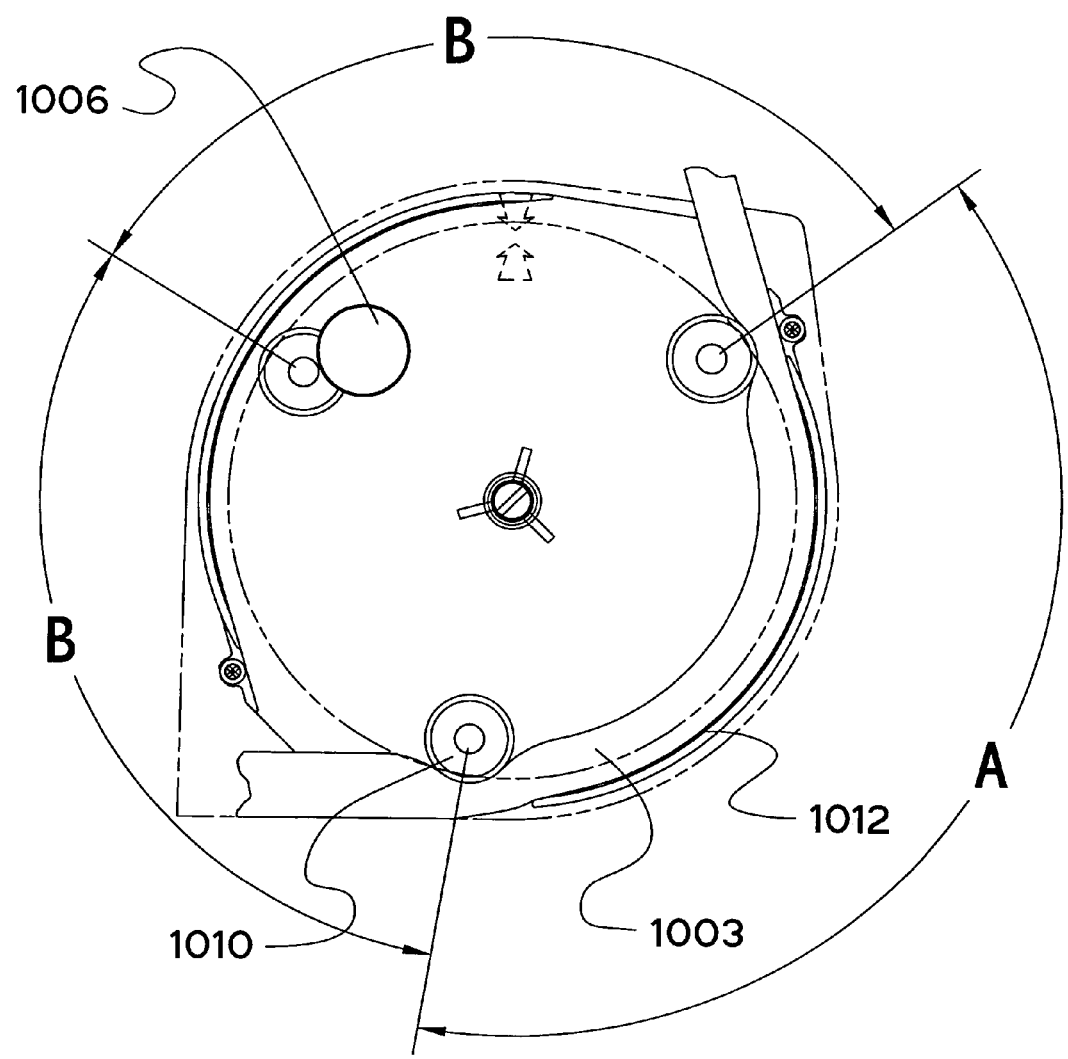
FIG. 24 is a partial detail of the inside of the pump of FIG. 23.

A ninth alternative embodiment watering can 1000 is shown in FIGS. 23 and 24 and is meant to provide the same functionality as the seventh alternative embodiment without the complication of a trigger. In the overall view, FIG. 23, one can see that the embodiment is similar and retains arrows 1060 and 1061 which are cosmetic and aid the user in proper operation.

The pump of the ninth alternative embodiment is used in the following manner to evacuate a vessel of water: A snorkel device 1004 is put into the vessel from which water is to be evacuated so that the snorkel extends all the way to the bottom of the vessel. The watering can is held at a level which is below the height of the water vessel being emptied. A crank handle 1006 is cranked in the clockwise direction in order to draw water into the snorkel 1004 and tube 1003. After a substantial portion of tube 1003 is filled with water, gravity will cause a positive pressure to form in the entrance of the pump. At this time, the user can position the crank handle 1006 such that the arrow 1060 and the arrow 1061 are approximately aligned with each other. Selecting this position of in the crank rotation removes the pinch points from the flexible tube and therefore allows the water to flow freely under the influence of gravity. The water leaving tube 1003 into the watering can will cause additional water to be drawn into tube 1003 via snorkel 1004. This process will continue until the vessel is completely evacuated of water and air starts to enter the snorkel 1004.

To see why the flexible tube 1003 is not pinched when arrows 1060 and 1061 are aligned, refer to FIG. 24 showing the inside of the pump with the cover and drive disk 1008 shown transparent. Here it can be seen that the rollers 1010 in this design are not distributed symmetrically about the drive disk 1008. Instead, angle A is significantly larger than angle B such that in the position shown, none of the rollers 1010 pinch the tube substantially against pump wall 1012 causing the pinch point to seal. This means that at this spot in the rotation, the tube is open and free to act as a siphon. Since the angle is small where this condition is true, the brief disengagement of the pinch points will not affect pump performance greatly while cranking.

Although the present invention has been described herein by various embodiments, it is not to be so limited since changes and modifications can be made which are intended to be covered by the claims as hereinafter stated.

What is claimed is:

1. A watering can intended for watering household plants and flowers comprising:
    a body defining a reservoir for, holding liquid of a size and shape allowing said watering can to be easily carried with one hand;
    an elongated rigid spout rigidly connected to the body with at least one spout opening on its end positioned in order to allow liquid to be easily poured from said watering can only when said watering can is tilted from its level resting position;
    at least one other opening communicating to said reservoir, said other opening being: larger than said spout opening(s), configured to allow said reservoir to be easily filled with a liquid not provided with features to allow it to be sealed against the passage of liquids, and positioned such that when said watering can is placed on a level surface for filling, said spout opening is at substantially the same or higher position vertically;
    a pump adjacent the body;
    and a snorkel connected to the pump whereby the pump and the snorkel are capable of extracting liquid from a vessel and into the reservoir.

2. The watering can of claim 1 wherein the pump is a peristaltic pump.

3. The watering can of claim 1 further comprising a flexible tubing positioned between the snorkel and the pump.

4. The watering can of claim 3 wherein the pump comprises:
    a drive plate;
    a crank handle attached to the drive plate;
    at least two rollers attached to the drive plate;
    and a roller bearing surface, whereby the rollers pinch the flexible tubing against the roller bearing surface to create suction.

5. The watering can of claim 1 wherein the pump is a gear pump.

6. The watering can of claim 5 wherein the gear pump comprises:
    a crank handle;
    and a pump driving shaft attached to the crank handle;
    and at least two gears which are moveable by the pump driving shaft.

7. The watering can of claim 1 wherein the pump includes an electric motor.

8. The watering can of claim 4 wherein the drive plate includes a trigger assembly and release button for siphoning the liquid from the vessel.

9. The watering can of claim 1 wherein the pump is located in a flexible walled handle attached to the body.

10. The watering can of claim 1 wherein the body has a divider for separation of extracted liquid from fresh liquid.

11. The watering can of claim 2 wherein said peristaltic pump is driven by an electric motor.

12. A fluid collecting container comprising:
    a body portion having an interior compartment;
    a handle attached to the body portion;
    a spout attached to the body portion;
    a peristaltic pump located on a wall of the body portion comprising:
    a drive plate;
    a crank handle attached to the drive plate;
    at least two rollers attached to the drive plate;
    a roller bearing surface, whereby the rollers pinch the flexible tubing against the roller bearing surface to create suction;
    a configuration by which all of said rollers may be disengaged so as to not pinch said flexible tubing against said wall;
    and a snorkel connected to the pump for placement into a vessel to draw liquid into the interior compartment of the body portion by actuation of the pump.

13. The fluid collecting container of claim 12 further comprising a flexible tubing positioned between the snorkel and the pump.

14. The fluid collecting container of claim 12 where said configuration of said pump is achieved by a mechanism which moves one or more of said rollers away from said roller bearing surface thereby creating a situation at at least one position of said drive plate where no rollers pinch said flexible tubing.

15. The fluid collecting container of claim 12 where said configuration of said pump is achieved by providing at least one position of said drive plate where none of said rollers are in close proximity to said roller bearing surface.

16. A method of filling a fluid collecting container comprising:
- a body portion having an interior compartment;
- a handle attached to the body portion;
- a spout attached to the body portion;
- a peristaltic pump located on a wall of the body portion comprising:
- a drive plate;
- a crank handle attached to the drive plate;
- at least two rollers attached to the drive plate;
- a roller bearing surface, whereby the rollers pinch the flexible tubing against the roller bearing surface to create suction;
- a configuration by which all of said rollers may be disengaged so as to not pinch said flexible tubing against said wall;
- and a snorkel connected to the pump, Said method comprising the steps of:
- placing the snorkel into a vessel containing a liquid;
- actuating the pump;
- and drawing the liquid through the snorkel and into the fluid collecting container.

17. The method of claim 16 further comprising the steps of:
- placing said pump in said configuration by which all of said rollers may be disengaged so as to not pinch said flexible tubing against said wall;
- and allowing siphoning action driven by gravity to continue the extraction of said liquid from said vessel.

* * * * *